United States Patent

Dayton et al.

[15] 3,691,464

[45] Sept. 12, 1972

[54] ASYNCHRONOUS, SWEPT FREQUENCY COMMUNICATION SYSTEM

[72] Inventors: David S. Dayton, Acton; Alfred L. Girard, Billerica, both of Mass.

[73] Assignee: Technical Communications Corporation, Lexington, Mass.

[22] Filed: Nov. 25, 1968

[21] Appl. No.: 789,631

Related U.S. Application Data

[63] Continuation-in-part of Ser. No. 518,901, Jan. 5, 1966, abandoned.

[52] U.S. Cl. ........................325/55, 179/15, 325/38, 325/131, 343/203

[51] Int. Cl. ..............................................H04j 7/00

[58] Field of Search ........178/66, 67; 325/30, 38, 41, 325/42, 55, 65, 131; 343/200, 203; 179/15; 390/171

[56] References Cited

UNITED STATES PATENTS

| | | | |
|---|---|---|---|
| 2,422,664 | 6/1947 | Feldman | 325/65 |
| 2,719,188 | 9/1955 | Pierce | 179/15 |
| 3,176,225 | 3/1965 | Ransom et al. | 325/38 |
| 3,197,563 | 7/1965 | Hamsher et al. | 179/15 |
| 3,239,761 | 3/1966 | Goode | 325/55 X |
| 3,292,178 | 12/1966 | Magnuski | 343/203 |
| 3,484,693 | 12/1969 | Fong | 325/131 X |

*Primary Examiner*—Robert L. Griffin
*Assistant Examiner*—Benedict V. Safourek
*Attorney*—Kenway, Jenney & Hildreth

[57] ABSTRACT

A communication system for transmitting information in digital form from a transmitter to a receiver through a noisy or disturbed channel. Each digit of the digital data to be transmitted is modulated or encoded as one or more radio frequency pulses, each radio frequency pulse being frequency modulated in a distinctive manner in accordance with a predetermined continuous function for at least a portion of its duration. The receiver is constructed to uniquely receive data so modulated or encoded. Two embodiments are described. In one embodiment the data to be transmitted is in the form of pulses and each data pulse is encoded into a plurality of frequency modulated radio frequency pulses. In a second embodiment the data is a series of "ones" and "zeros" and each one and zero is represented by a pulse of radio frequency energy. Each pulse is frequency modulated in a distinctive manner to identify it as a "1" or a "0."

14 Claims, 19 Drawing Figures

INVENTORS.
DAVID S. DAYTON
ALFRED L. GIRARD

INVENTORS.
DAVID S. DAYTON
ALFRED L. GIRARD

INVENTORS.
DAVID S. DAYTON
ALFRED L. GIRARD

INVENTORS.
DAVID S. DAYTON
ALFRED L. GIRARD
BY

INVENTORS.
DAVID S. DAYTON
ALFRED L. GIRARD

INVENTORS.
DAVID S. DAYTON
ALFRED L. GIRARD

INVENTORS.
DAVID S. DAYTON
ALFRED L. GIRARD

INVENTORS.
DAVID S. DAYTON
ALFRED L. GIRARD

INVENTORS.
DAVID S. DAYTON
ALFRED L. GIRARD

INVENTORS
DAVID S. DAYTON
ALFRED L. GIRARD
BY
Kenway, Jenney & Hildreth
ATTORNEYS INVENTORS
DAVID S. DAYTON
ALFRED L. GIRARD
BY Kenway, Jenney & Hildreth
ATTORNEYS INVENTORS
DAVID S. DAYTON
ALFRED L. GIRARD
BY Kenway, Jenney & Hildreth
ATTORNEYS INVENTORS
DAVID S. DAYTON
ALFRED L. GIRARD
BY Kenway, Jenney & Hildreth
ATTORNEYS INVENTORS
DAVID S. DAYTON
ALFRED L. GIRARD
BY Kenway, Jenney & Hildreth
ATTORNEYS INVENTORS
DAVID S. DAYTON
ALFRED L. GIRARD
BY Kenway, Jenney & Hildreth
ATTORNEYS

ASYNCHRONOUS, SWEPT FREQUENCY COMMUNICATION SYSTEM

This application is a continuation-in-part of U.S. patent application Ser. No. 518,901, filed Jan. 5, 1966, now abandoned.

Our invention relates to an improved communication system. More particularly, it relates to a communication system which make possible effective communication between one or more transmitters and one or a group of receivers. The receivers may be at locations which may or may not be separated from one another. The system of our invention permits communication even when the communications medium or channel is severely perturbed either by radio or other natural or man made interference or by other transmitters using the same communications channel.

The communications system of our invention is particularly useful with communications networks in which it is desired to transmit information from a certain specified transmitter to one or more of a selected group of receivers or in which it is desired to transmit information simultaneously from several transmitters to several different selected groups of one or more receivers. The invention permits the simultaneous transmission of information from several transmitters to one or more receivers of the several selected groups of receivers over the same channel while preserving distinguishability among messages. Distinguishability, here, is understood to mean the ability to separate one message or symbol from any other. Thus two messages are said to be distinguishable when they are separable from one another, that is, when all of the information in either may be recovered even though both are simultaneously present.

In any communication system it is necessary to establish some path or channel between the transmitter and the receiver over which the signal is to travel, to provide a method of impressing the intelligence to be transmitted on some form of carrier, and to address each message to the intended receiver. In most systems, these results are accomplished at the expense of increased use of the frequency spectrum which the communication channel provides, increased complexity and cost of equipment, or loss of time or a combination of these. In many practical communications systems, either precise system time or frequency synchronization, or rigid control of transmissions in the system, or both, are required. Further, because the radio frequency spectrum is crowded long waits for free channels are sometimes necessary or increased error rates must be tolerated.

All of these problems occur today in communications systems in which rigid control is possible and in which all users cooperate. In communications systems in which, because of the remoteness of the transmitters and receivers, rigid systems control or synchronization is impossible, or in which cooperation among users is not possible, or in systems in which deliberate interference is inserted, the problem is compounded. For example in a tactical military situation, and in many civil circumstances, the need for immediate communications between units is frequently important and urgent. Coordination of spectrum use may be impossible because of the tactical situation or because of the separation of the units. However interference between these units may frequently occur. Further, enemy transmissions are obviously not likely to be coordinated, in fact, they may be designed deliberately to cause interference.

A further problem is to identify each transmission uniquely for the intended receiver or receivers. One method of accomplishing this that has been proposed is to incorporate in the communication system a way of signaling one or more of a group or a plurality of receivers so as to alert them that a message intended for one or more receivers is to be transmitted. One such signaling scheme is that described in U.S. Pat. No. 2,955,279, entitled "Selective Paging Systems" issued Oct. 4, 1960.

A second method of insuring that all messages directed to one or more of a plurality of receivers are identified by those receivers for which they are intended is to maintain a communication link to each at all times. This link might be a particular portion of the radio frequency spectrum, a direct wire connection, or a particular time position in a time division transmission system. The maintenance of this link at all times denys its use to others and in effect increases the communication system load.

Another way of addressing a message for the receiver or receivers to which it is directed which has been proposed is to transmit the message in a particular channel or frequency band with some characteristic of the transmission serving as an address. This characteristic of the transmission may be the portion of the frequency band being used, the time of the transmission, or some combination of both. That is, the communication system may be so organized that a given pattern in a time-frequency matrix serves to identify the receiver or receivers for which any message is intended. Each message is itself tagged or addressed in such a way that only a receiver with the correct address can receive that message. The system of our invention is compatible with and can be used in conjunction with the time-frequency matrix system of addressing. A more complete description of this system is given in an article by L. S. Schwartz appearing in "Space/Aeronautics" for Dec. 1963 (pp. 84–89) entitled "Wide-Bandwidth Communication."

We have found that we can communicate more efficiently in the presence of noise or interference in a communication system which is organized such that the information to be communicated is in pulse form and further, if each pulse of the pattern is frequency modulated in a characteristic manner. The frequency modulation may be linear or non-linear, of positive slope (i.e., increasing frequency) or negative slope (decreasing frequency), saw-tooth, or in some other shape. Further, the intervals of time between each pulse may be varied. Using the system of our invention there is no requirement for time synchronization between the transmitter and receiver locations.

In the system of our invention a stream of pulses representing intelligence is encoded before being transmitted according to a prearranged scheme and transmitted as a series of radio frequency pulses, each on a different frequency and separated by suitable delays. Further the carrier frequency is varied during the interval of transmission of each pulse, according to the prearranged scheme. The frequency modulated pulses are received by a plurality of receivers, each of which either accepts or rejects the pulse pattern depending on the form of the pattern and the frequency modulation on each pulse. In each receiver for which the message was intended, the frequency on which the pulse was transmitted, the rate at which each pulse was frequency modulated at the transmitter, and the time delay between pulses is recognized using filters and delay lines. The information thus obtained is used to reconstruct the original stream of pulses which was encoded at the transmitter. When the system of our invention is used in conjunction with a time-frequency matrix system of addressing as described above, we in effect add a third dimension to the time-frequency coding pattern, frequency modulation. This additional dimension permits more addresses, each unique, to be formed and permits a larger number of simultaneous distinguishable messages to be transmitted within a limited radio frequency spectrum allocation than could be accomplished by a simple time-frequency matrix.

We are of course aware that pulse transmissions have been heretofore frequency-modulated, particularly in the radar art. A system which uses these techniques is the so-called "chirp" radar, (U.S. Pat. No. 2,624,876 issued to R. H. Dicke, Jan. 6, 1953). The purpose of pulse compression in a "chirp" radar system is to increase the ratio of the amplitude of the returned radar echo to the amplitude of the system noise without destroying the capability of the radar system to resolve closely spaced targets. In a "chirp" radar, as in any electronics system, the peak power which may be transmitted is limited by the amount of potential (voltage) which the components will withstand without arcing. To overcome this limitation, a frequency-modulated pulse of less and constant power but of longer duration is transmitted. At the radar receiver, the returned radar echo which is similarly frequency-modulated is inserted into a matched filter which has a delay versus frequency characteristic such that the leading portions of the returned pulse are delayed longer than the succeeding portions. The result is that all of the energy of the pulse reaches the output end of the delay at sensibly the same instant thus forming a higher amplitude pulse at the detector. The noise in the system on the other hand does not add up in the same way and the overall effect is to increase the actual signal to noise ratio. The ability of a "chirp" radar to resolve closely spaced objects is preserved because the radar echos will be separated in the delay line. While both the "chirp radar" and the system of our invention use frequency modulated pulse transmissions, in the radar system pulse compression at the receiver is used to preserve the resolution of target echos while increasing the range at which a target can be tracked because of the permitted increase in transmitter average power. In the system of our invention frequency modulation and pulse compression are used to distinguish among messages from different transmitters, as part of an addressing system.

While we have so far described our invention as being used as part of an addressing system, it is not limited to such use. It may be used for example simply to transmit data in digital form over a noisy or disturbed channel. If the data to be transmitted is in binary form, for example, a "1" may be transmitted as a pulse of radio frequency energy whose frequency varies linearly in accordance with a modulating signal having a positive slope while a "0" may be transmitted as a pulse of radio frequency energy whose frequency is modulated with a signal whose slope is opposite to that used to encode the "1," e.g., a negative slope. These pulses may follow each other a rate limited by the channel bandwidth. The pulses are appropriately demodulated at the receiver as a "1" or a "0." Such a system provides substantial improvement in the transmission of digital data when multipath or Doppler effects are present in the communication path.

Accordingly, it is a principal object of our invention to provide a communications system which permits communication between a transmitter and a receiver over any kind of communications channel which may be disturbed by noise or the transmissions of other transmitters regardless of the nature of the medium of transmission. Still another object of our invention is to provide a communication system capable of transmitting digital data using linear frequency modulated pulses of differing slopes to distinguish between different digits of the data. Another object of our invention is to provide apparatus for uniquely encoding pulse transmissions so that the transmissions may be received by one or a group of addressed receivers. A further object of our invention is to provide apparatus for receiving and decoding pulses which have been encoded in accordance with our system. A still further object of our invention is to provide a system of the type described which is compatable with and may be used in conjunction with the communications systems using the time-frequency matrix method of addressing.

Other and further objects of our invention will in part be obvious and will appear from the following detailed description in which:

FIG. 2(*b*) is a schematic diagram of one form of slope shaper useful in the circuitry of FIG. 2(*a*);

FIG. 4(*b*) is a block and line diagram of a frequency translation circuit useful in the apparatus of FIG. 4(*a*);

Figure 9:
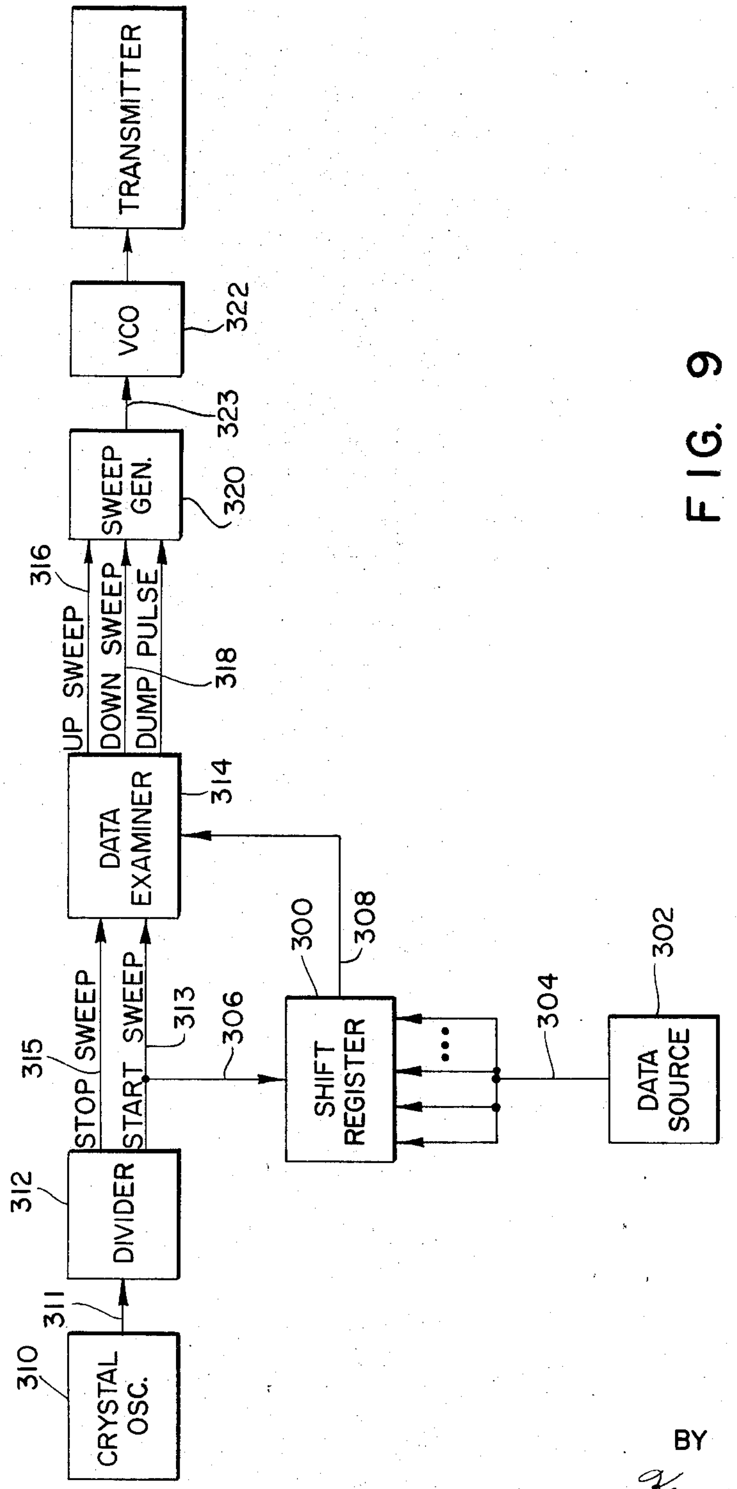
Figure 10:
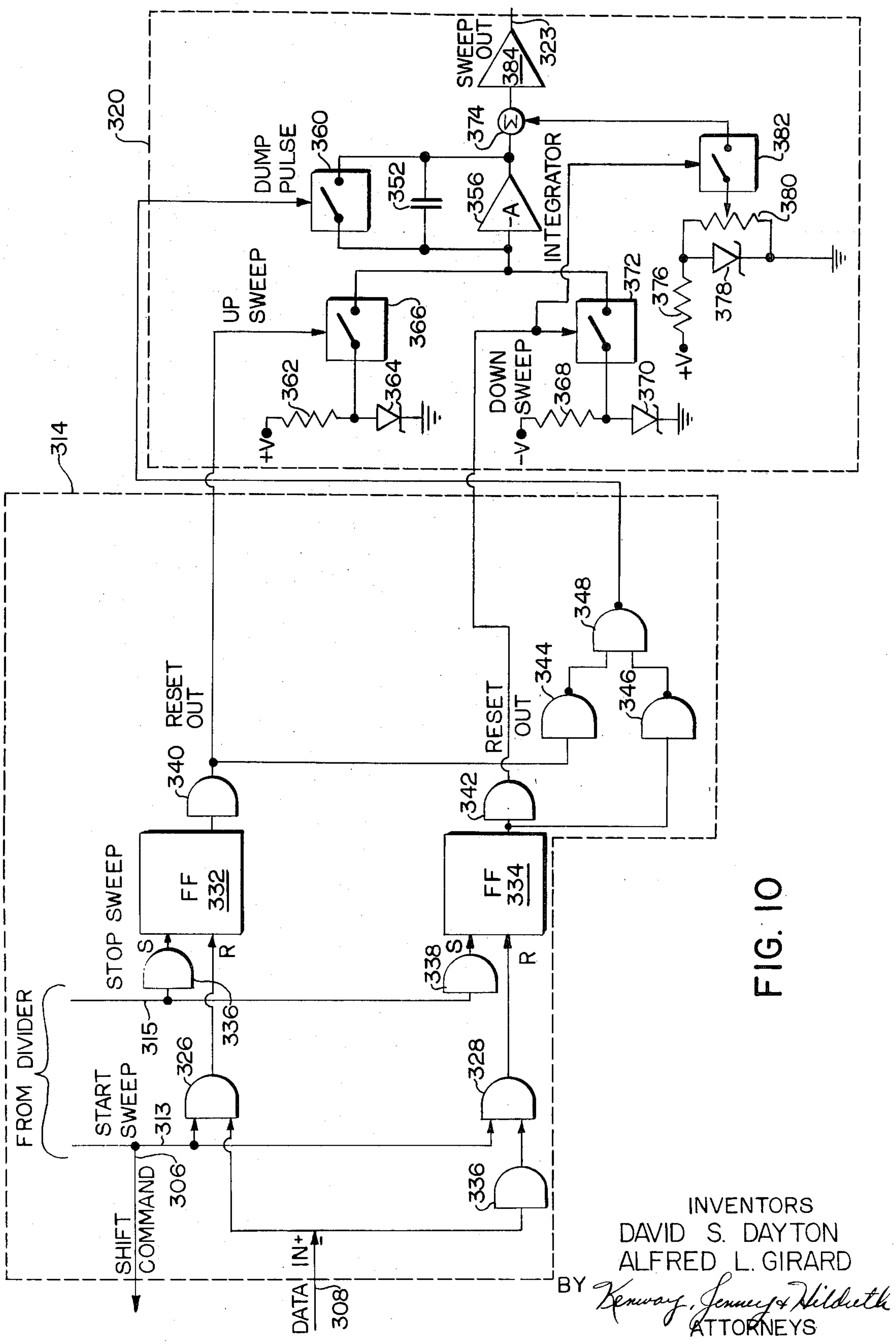
Figure 11:
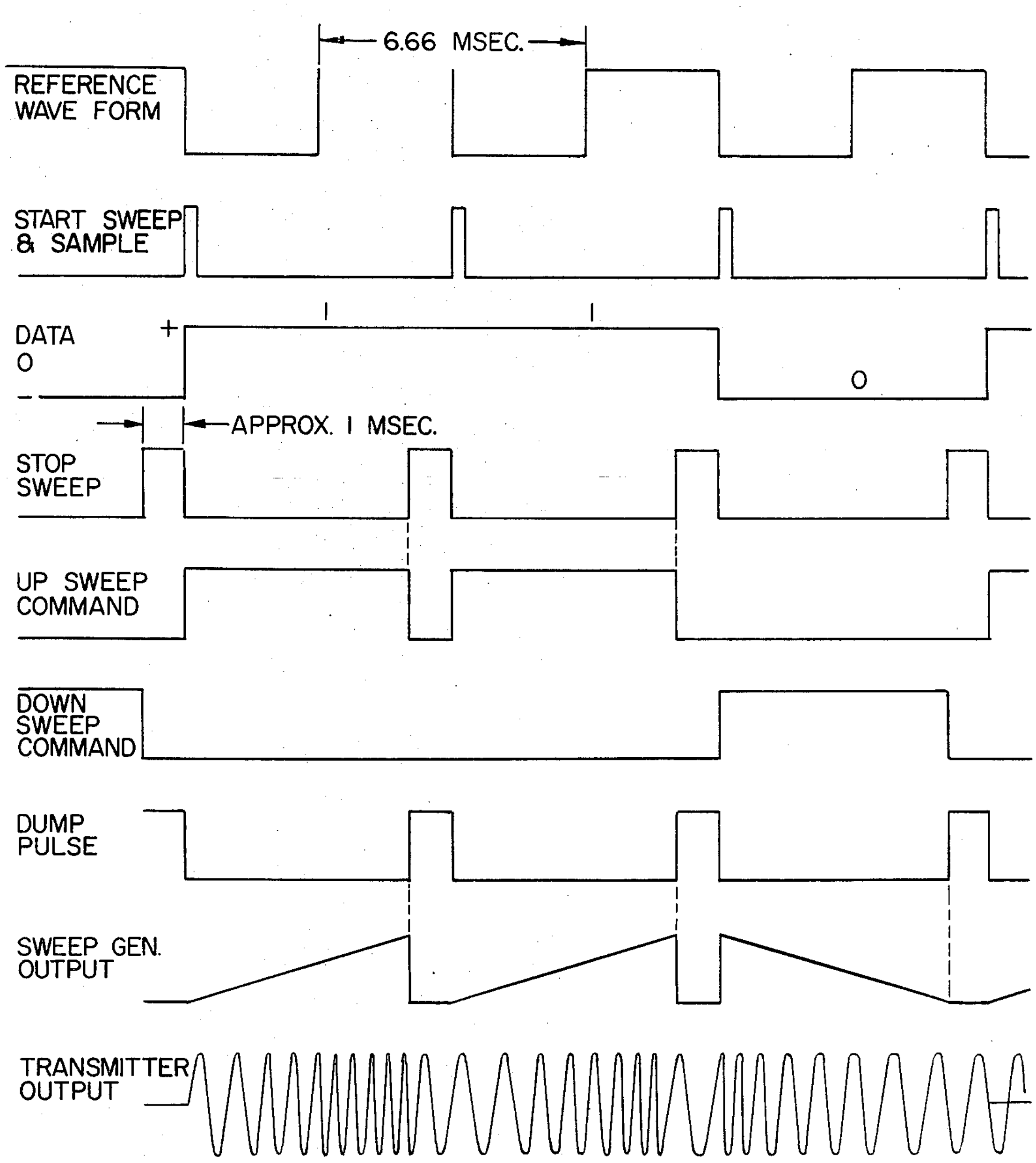
Figure 12:
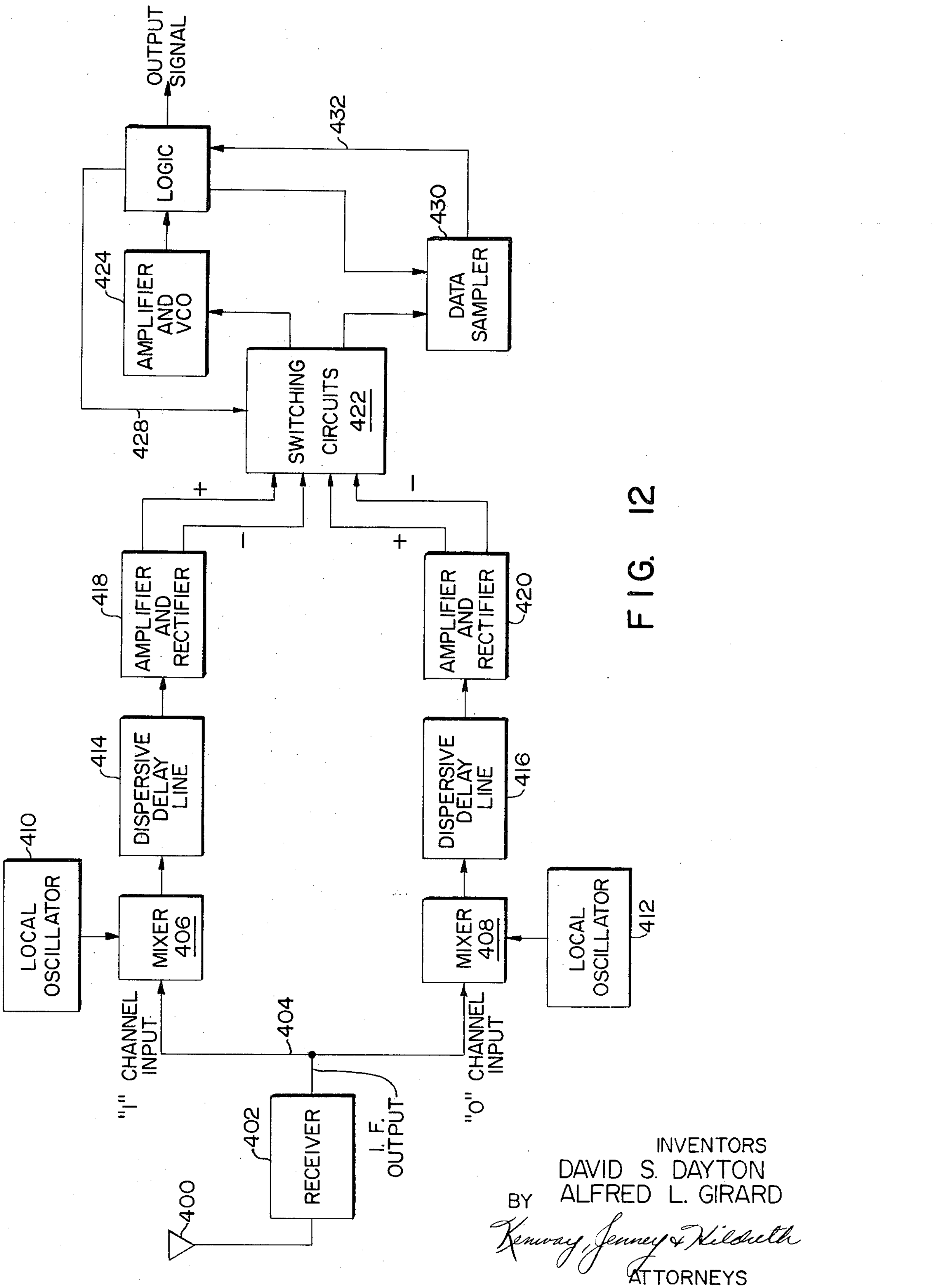
Figure 13:
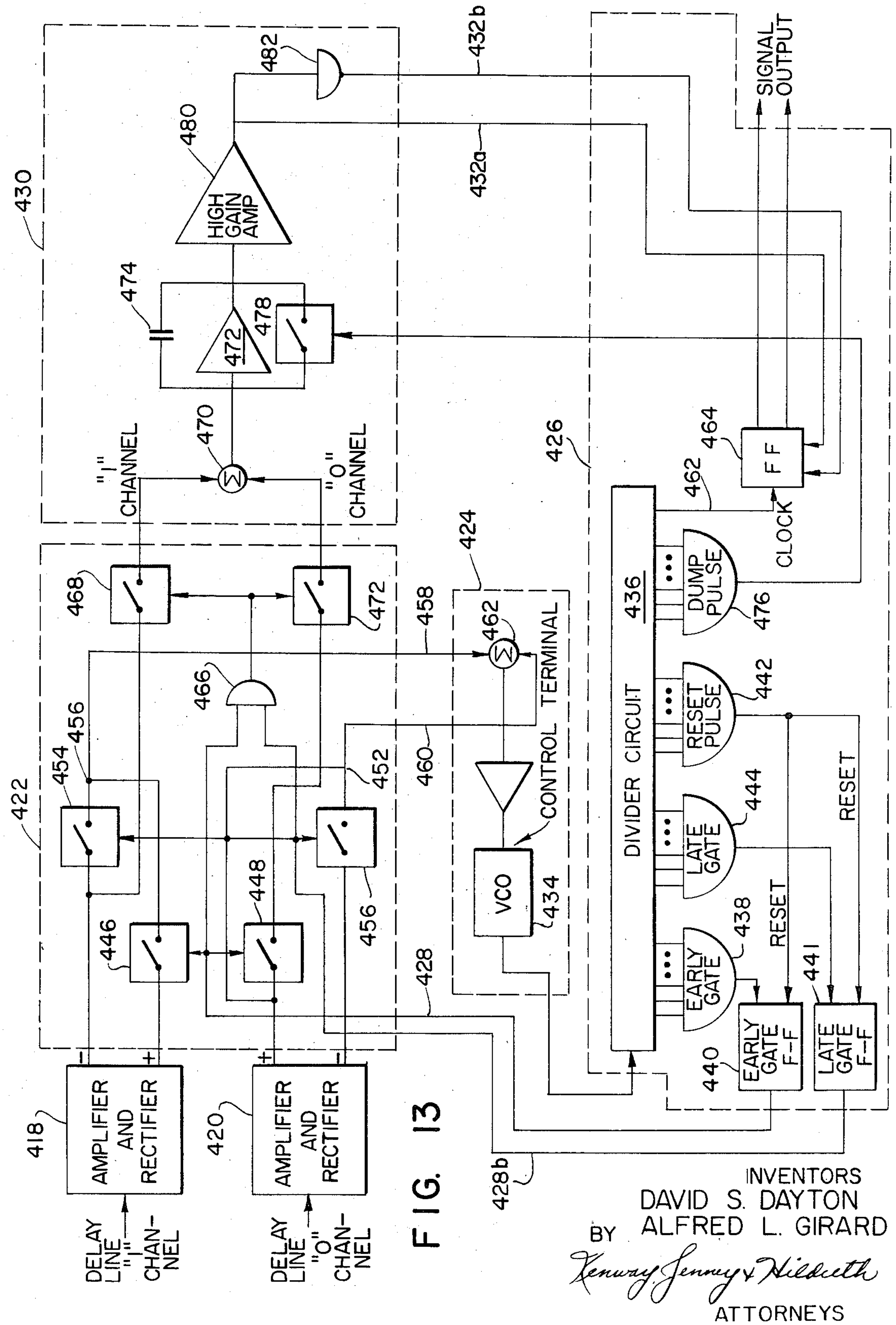
Figure 14:
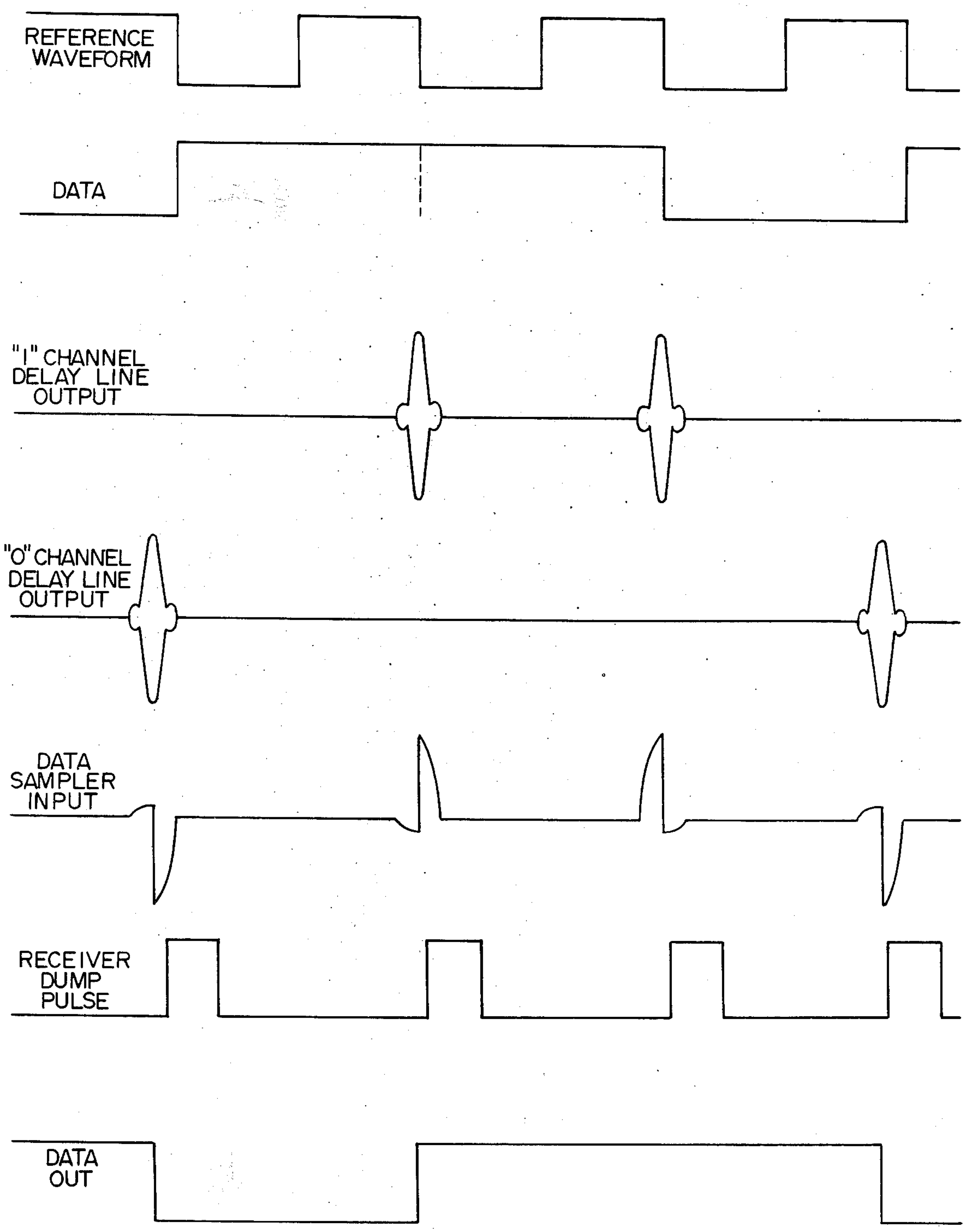

FIGS. 8(*a*), 8(*b*), 8(*c*) and 8(*d*) are diagrams illustrating the manner in which our invention may be used to provide multiple addresses in a single time-frequency matrix;

FIG. 9 is a block and line diagram of a transmitter useful in transmitting digital data in binary form in accordance with our invention;

FIG. 10 is a more detailed block and line diagram of the data examining and sweep generating circuits illustrated in block diagram form in FIG. 9;

FIG. 11 is a timing diagram illustrating waveforms as a function of time in the circuit of FIG. 9;

FIG. 12 is a block and line diagram of a receiver useful in receiving signals transmitted by the transmitter of FIG. 9;

FIG. 13 is a more detailed block and line diagram of the switching circuits, amplifier and VCO circuit, the logic circuit and the data sampler circuit of FIG. 12; and FIG. 14 is a timing diagram illustrating waveforms as a function of time in the circuit of FIG. 12.

While in the following detailed specification we will describe our invention in connection with a conventional radio communications system, it will be understood that our invention is not limited as to the type of communication channel with which it may be used. Open wire cables, coaxial cables, waveguides, or other apparatus may provide the communications channel between transmitter and receiver.

For convenience and to simplify the drawings showing the apparatus of our invention, the return leads for circuits have not been shown or described. Further, circuits which function only to amplify or shape pulses have been omitted. The addition of such circuits to improve pulse shape or provide pulses of appropriate level will depend upon the exigencies of the particular design and the necessity for such circuits as well as the provision of them, is obvious from ordinary design considerations in any particular instance.

Figure 1:
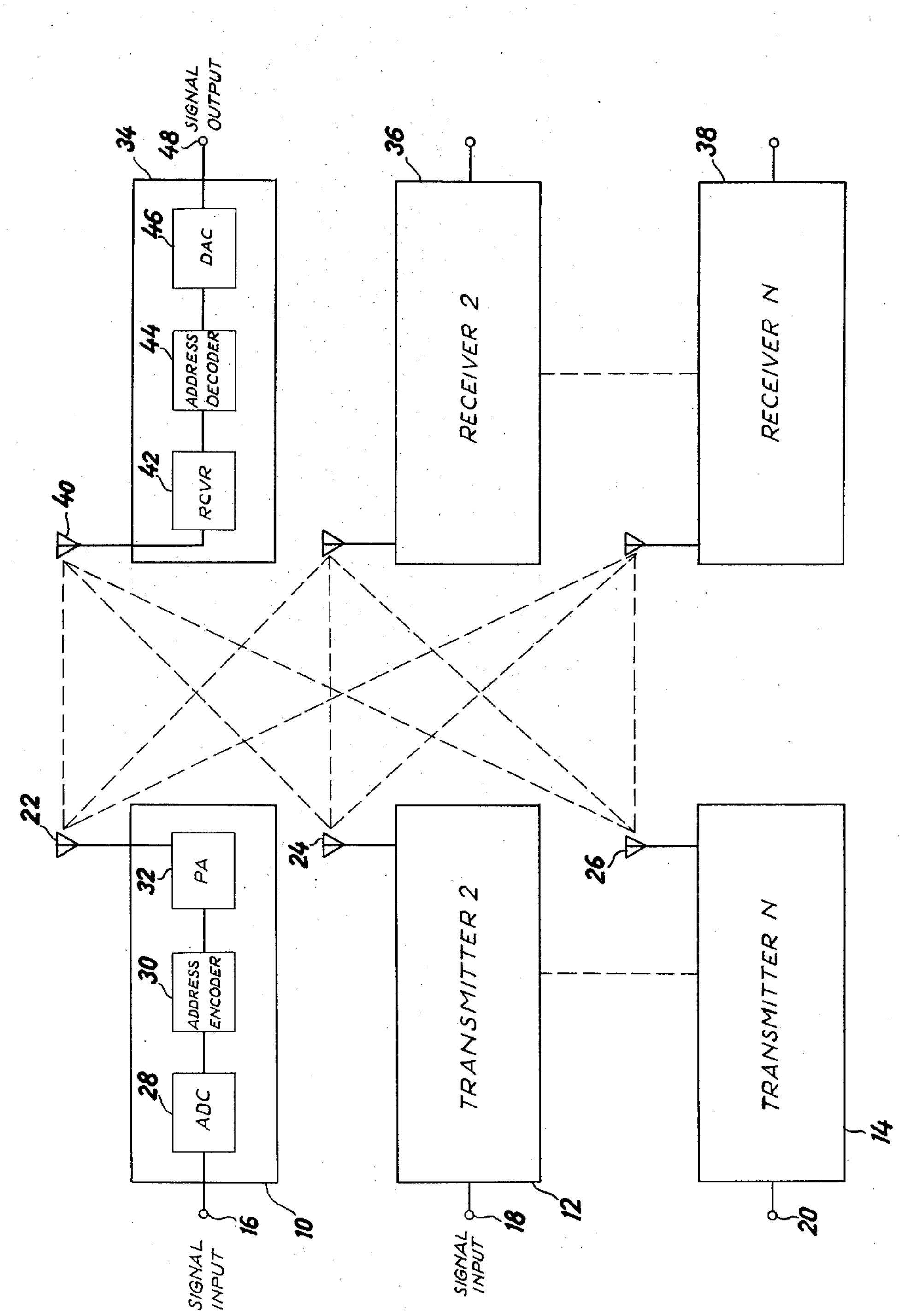
FIG. 1 is a block and line diagram illustrating a typical communication system incorporating our invention.

FIG. 1 illustrates a typical radio communication system in which our invention may be used to provide address encoding. Three transmitters 10, 12 and 14 which may be representative of any larger number of transmitters are provided. The transmitters are assumed to be substantially identical in design, although this is not a system requirement. Each transmitter is provided with an input terminal, 16, 18 and 20 respectively to which the signal to be transmitted by the particular transmitter is supplied. Additionally each transmitter is provided with an antenna 22, 24 and 26. Each transmitter, as shown by transmitter 10, includes an analog to digital converter 28, an address encoder 30 and a power amplifier 32.

The signal to be transmitted, if an analog form is encoded in digital form by the analog to digital converter, which may be of conventional design. However, if the signal is already in digital form, then, of course the analog to digital converter may be omitted.

The transmitter includes an address encoder, whose function is to encode in a particular manner to be described more fully below, the electrical pulses which are to be transmitted. After each pulse is encoded in a manner which is characteristic of the receiver to which the signal is addressed, the signal from the encoder is supplied to a conventional power amplifier which supplies the antenna 22.

The receiving stations 34, 36 and 38 illustrated in FIG. 1 are, like the transmitters, assumed to be substantially identical although again, this is not a system requirement. Each receiving station will typically include an antenna 40, a conventional receiver 42, as shown in connection with receiving station 34, an address decoder 44 and a digital to analog converter 46 of appropriate design if it is desired that the received signal be in analog format. The digital to analog converter (or the address decoder 44 if no digital to analog converter is used) supplies the received signal to the signal output terminal 48.

Using the system of our invention it is possible for all the transmitters and all the receivers shown in FIG. 1 to utilize the same portion of the frequency spectrum the same coaxial cable or the same wires in a cable or wire system and for simultaneous transmissions between transmitters and receivers to take place and yet to have one transmitter, e.g., transmitter 10, communicate with one and only one receiver, e.g., receiver 34, or with one group of receivers such as receivers 34 and 36.

The pulse signal to be transmitted is utilized to generate a pulse or pulses of high frequency energy at the transmitter frequency, (or a submultiple of the transmitter frequency) of substantially constant amplitude. The pulse or pulses are frequency modulated in a predetermined manner, and amplified by the power amplifier 32 and transmitted. The receivers in the system are provided with address decoders, such as address decoder 44. Each address decoder is uniquely responsive to pulsed signals of a given duration whose frequency varies in some prescribed manner, as will be explained in greater detail below. Thus to address any receiver (or group of receivers having similar address decoders) the pulses to be transmitted are encoded in the manner to which the addressed receiver is uniquely responsive. As will more fully appear below, only signals properly encoded will be supplied as output signals by the receiver, improperly coded signals and noise being rejected by the receiver.

Figure 2A:
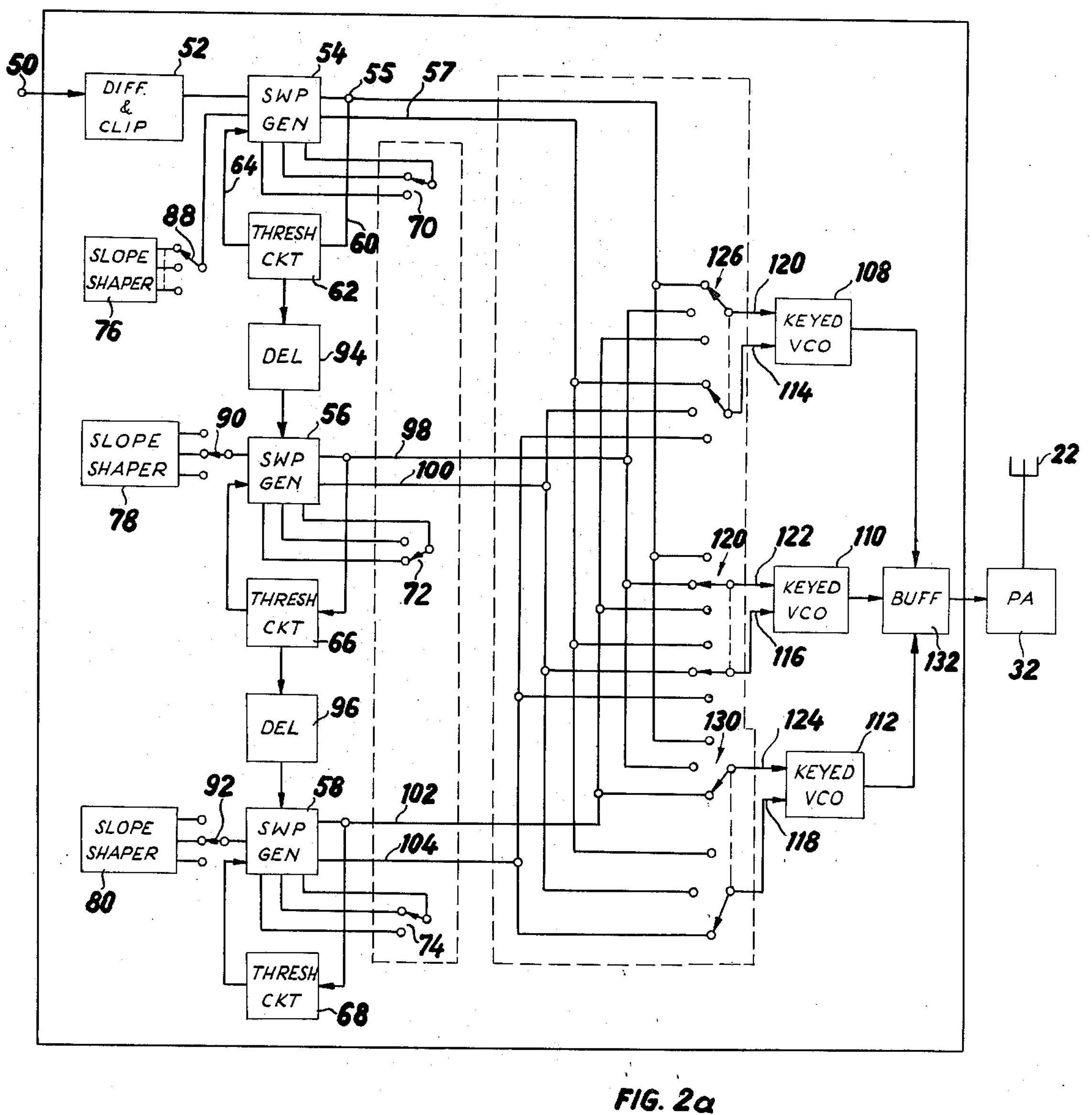
FIG. 2(*a*) is a block and line diagram showing in greater detail a pulse signal address encoder for use in a transmitter, which in turn is used in the system of our invention.
Figure 2B:
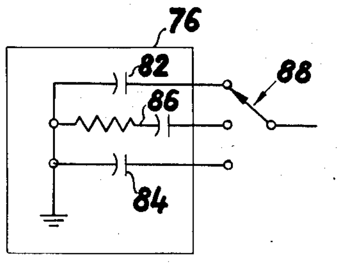

In FIG. 2(*a*) we have illustrated the address encoder portion of the transmitters shown in FIG. 1. The function of the address encoder is to receive a message pulse and encode it into a selected group of pulses frequency modulated for transmission by the power amplifier and antenna in conventional fashion.

The input terminal 50 of the address encoder is connected as shown to a conventional differentiating and clipping circuit 52 which supplies a pulse of appropriate polarity to a sweep generator circuit 54.

The sweep generating circuit 54, as well as the sweep generating circuits 56 and 58 to be described below may be of similar and conventional design. When a pulse is supplied to the circuit 54 from the differentiating and clipping circuit 52, a gate signal is initiated. During the continuance of this gate signal, an output voltage is provided which either rises (or falls) as a function of time. The modulation in the simplest case is linear but may include non-linear modulation of various types. Both the gate signal and the sweep signal appear as output signals from the sweep generator 54, the sweep signal on lead 55 and the gate signal on lead 57. The sweep signal appearing on lead 57 in addition to being used elsewhere in the circuit is connected, via lead 60 to the threshold circuit 62. This latter circuit, also of conventional design is arranged to generate an output pulse on lead 64 to end the gate signal and terminate the sweep signal appearing on leads 55 and 57. A Schmitt trigger circuit for example may be used for the threshold circuit 62. Similar threshold circuits, identified by the reference characters 66 and 68 are associated with the sweep generators 56 and 58.

Each of the sweep generators 54, 56 and 58 is provided with a two position switch 70, 72 and 74 which permits switching the sweep slope so that the slope of the sweep waveform is positive or negative. An auxiliary "slope shaper circuit," 76, 78 and 80 is also associated with each sweep generator. An example of a typical "slope-shaper" is shown in FIG. 2(*b*).

As there illustrated the "slope-shaper" circuit includes a plurality of capacitors, or resistor-capacitor combinations, as for example capacitors 82 and 84 and resistor-capacitor combination 86. Each individual capacitor or resistor-capacitor combination is connected to one of the fixed contacts of a multi-pole switch 88, 90 or 92 whose moveable contact is connected to the respective sweep generator. By selecting one of the capacitors, or resistor-capacitor combinations by manual movement of the switch, this capacitor being the capacitor which is charged to generate the sweep signal, the slope of the sweep can be selected.

Thus, by manual positioning of the switches 70, 72 and 74 the polarity of each of the three sweep voltages may be selected and by further manual positioning of the switches 88, 90 and 92 the rate of rise of the sweep signals from the sweep generators 54, 56 and 58 may similarly be manually selected.

While we have shown only three elements in the slope shaper circuits, it is to be understood that as many additional capacitors, or resistor-capacitor circuits as desired might be provided.

The output from each of the threshold circuits 62 and 66 is supplied respectively to a delay circuit 94 and 96. The pulse supplied from each of the threshold circuits is delayed by the associated delay circuit and then applied to the sweep generator 56 and 58 respectively as an initiating pulse to perform the same function in each of these circuits as did the input pulse generated by the signal pulse on the lead 50.

It will be apparent that the input pulse will cause the sweep generator 54 to generate a sweep signal and gate signal until the time that the sweep voltage reaches a value sufficient to trigger the threshold circuit 62. Operation of the threshold circuit terminates the sweep and gate signals from the sweep generator 54 and, after a delay determined by the delay circuit 94 the sweep generator 56 will be triggered. The delay circuit can be of any known type which will supply the appropriate delay time required. The sweep generator circuit 56 will perform in a similar manner to the sweep circuit 54 until its sweep output voltage reaches a threshold value determined by the threshold circuit 66 at which time its sweep and gate signals will be terminated, and after a delay, the sweep generator 58 will similarly provide sweep and gate signals.

Thus, each input pulse appearing on the lead 50 will generate three different sweep voltages with a spacing between the sweep voltages determined by the delay circuits 94 and 96. The polarity of the individual sweep voltages may be either positive or negative depending upon the setting of the switches 70, 72 and 74 and the slope of the sweep voltages may be selected by appropriate positioning of the switches 88, 90 or 92.

The sweep voltage appearing at lead 55 and the gate voltage appearing on lead 57 from the sweep generator 54 is supplied to a matrix switch as are the sweep voltages from the sweep generator 56 appearing on the leads 98 and 100 and from the sweep generator 58 on leads 102 and 104. The matrix switch, which is of conventional design permits any one of the three sets of sweep and gate voltages to be connected, depending upon manually set switches, to one of three keyed voltage controlled oscillators identified as 108, 110 and 112.

The voltage controlled oscillators 108, 110 and 112 are similar and of conventional design. They require for operation a keying or gate voltage applied to the terminals 114, 116 or 118 respectively. When such a gate voltage is applied to their keying terminals, the oscillator oscillates providing an output signal of fixed amplitude whose frequency is dependent upon the amplitude of the signal applied to its control terminal 120, 122 or 124. Thus each of the oscillators 108, 110 and 112 will provide an output signal during the period that it is keyed whose frequency is dependent upon the sweep voltage applied to its control terminals.

As can be readily seen from inspection of FIG. 2(*a*), in the matrix switch circuit, each of the sweep and gate voltages from each of the sweep generators is applied to a bus; the bus in turn is connected to a fixed contact of three sets of switches, each set consisting of a double bank of three position switches, the individual banks being ganged together. The switch associated with voltage controlled oscillator 108 is identified as 126, that associated with voltage controlled oscillator 110 as 128, and that associated with voltage controlled oscillator 112 as 130. By selecting one of the three positions of the switch, the associated voltage controlled oscillator can be controlled both as to sweep and keying voltage by any one of the sweep generators. In the illustration shown in FIG. 2(*a*), voltage controlled oscillator 108 is being controlled by sweep generator 54, voltage controlled oscillator 110 is being controlled by sweep generator 56 and voltage controlled oscillator 112 is being controlled by sweep generator 58. However, by merely changing the position of the switches 126, 128 and 130 any combination could be selected. It is also apparent that, while we have shown conventional mechanical switches for use in forming the matrix switch connection between the voltage controlled oscillators and the sweep generators, it is possible that electronic switches could be used if desired.

The output of each of the voltage controlled oscillators is connected to an "or" or buffer circuit 132 so that the output of each oscillator will be isolated from the others and the buffer circuit output is connected as the signal to be amplified by a power amplifier 32 and then transmitted by the antenna 22.

It will be apparent that if the outputs of the voltage controlled oscillators are not of an appropriate frequency for transmission by simple amplification by the power amplifier 32, frequency changing circuits might be included in the power amplifier to modify the frequency of the voltage controlled oscillators as necessary or desirable.

Figure 3:
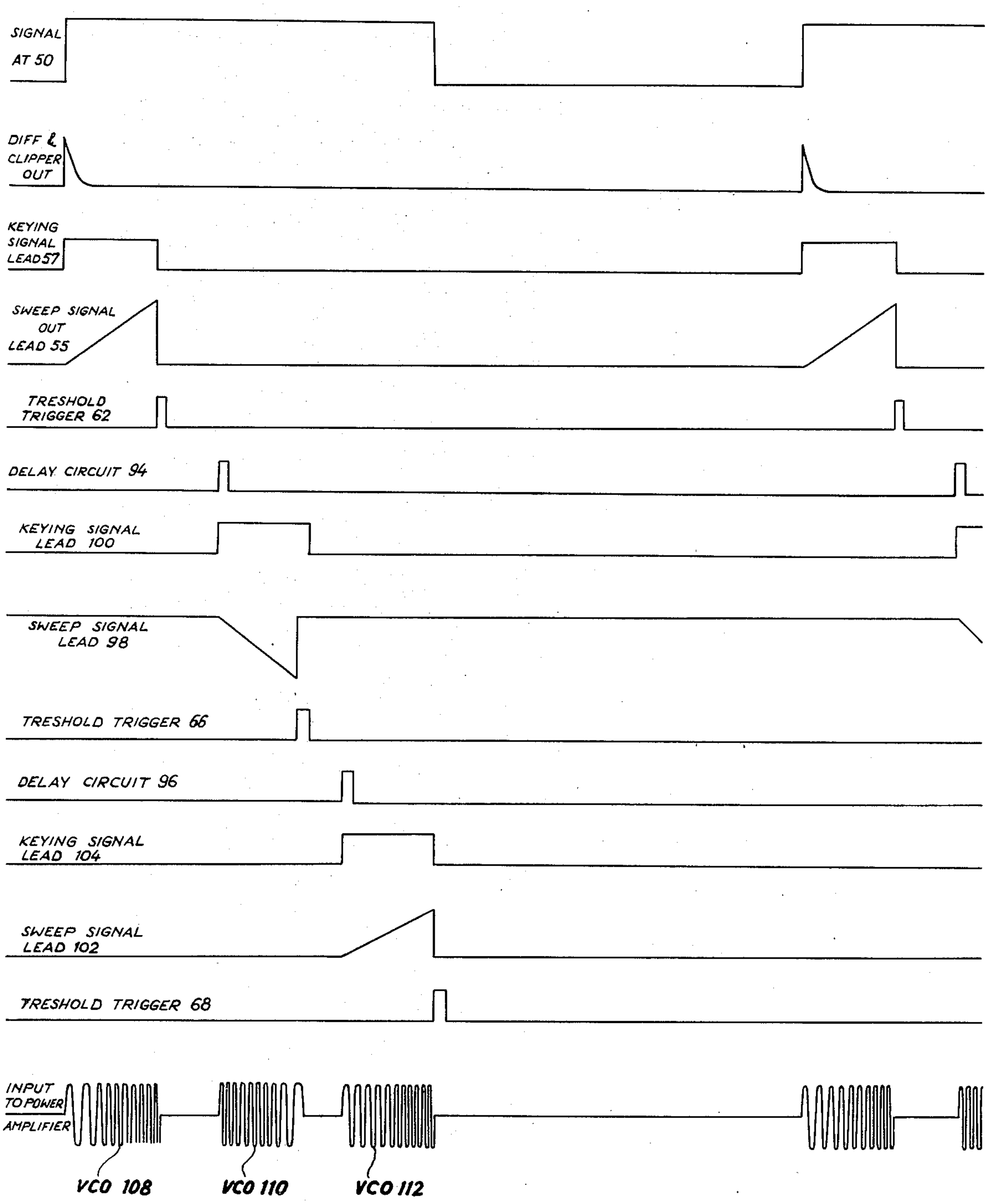
FIG. 3 is a timing diagram showing waveforms as a function of time at various points in the circuit of FIG. 2.

In FIG. 3 we have shown the waveforms associated with the circuit of FIG. 2(*a*) at various points in the circuit as an aid in understanding its operation. We will now describe the operation of the circuit with reference to FIG. 2(*a*) and FIG. 3. Each of the waveforms in FIG. 3 is a plot as a function of time of the waveforms occurring at the particular location in the circuit identified, the waveforms all appearing on the same time base. Thus, the signal appearing on lead 50 is shown as a pulse of digital information followed by a period during which there is no pulse present and followed by a further period in which a pulse appears. This signal is differentiated and clipped by the differentiator and clipper circuit 52 and the output of this circuit is shown on line 2 of the waveforms of FIG. 3. The pulses appearing on line 2 of FIG. 3 are applied to the sweep generator 54 and initiate the keying signal on lead 57 and the sweep generator output on lead 55. These signals continue for a time until the amplitude of the sweep from the sweep generator is sufficient to operate the threshold trigger 60 at which time the pulse appearing on line 5 of the waveforms of FIG. 3 appears. As explained earlier this pulse terminates the operation of the sweep generator and the keying signal from the sweep generator. Further, after a delay it is applied to the sweep generator 56. It will be observed from FIG. 3 that the sweep generator 56 generates a negative waveform of somewhat different slope than that generated by the sweep generator 54. It also generates a keying signal as explained above. Following the termination of the sweep by the threshold circuit 66, and after an appropriate delay the keying signal is supplied from the delay circuit 96 to the sweep generator 58. This functions in identically the manner described previously in connection with the sweep generators 54 and 56 to provide the sweep shown on line 12 and the keying signal on line 11 of the waveform diagram of FIG. 3. When the sweep signal from the sweep generator 58 reaches an appropriate height, it triggers the threshold circuit 68 and terminates that sweep also. The output of each of the voltage controlled oscillators to which the sweep and gate signals are supplied is shown on the last line of the waveform diagram of FIG. 3. As shown, the output signal of each of the oscillators is a pulse of radio frequency energy whose frequency is modulated in accordance with the signal applied to it. Thus the positive-going signal generated by the sweep generator 54 causes the oscillator to start at a relatively low frequency and sweep to a higher frequency. The negative going waveform from the sweep generator 56 causes the oscillator frequency to diminish in frequency as the sweep progresses while the positive going signal from the sweep generator 58 also causes the frequency of the oscillator to increase but at a slower than by the sweep signal from sweep generator 54. As previously noted, while we have illustrated our invention by the use of linear modulation, other forms of modulation may also be used.

These pulses of radio frequency energy, each pulse being individually modulated and of a different preselected base or center frequency are supplied to the buffer circuit 132 as they are generated and from there are passed to the power amplifier 32 for amplification and transmission by the transmitter.

In this manner, each pulse of the incoming waveform is encoded into a group of radio frequency pulses, each pulse being frequency modulated in accordance with a known slope and each pulse being separated as determined by the delays 94 and 96. By operation of the switches 70, 72 and 74 the polarity of each of the sweeps can be selected and by positioning of the switches 88, 90 and 92 the slope of each of the sweeps may be selected. Finally, each of the voltage controlled oscillators may be connected to any one of the sweep generator outputs. Alternatively, all voltage controlled oscillators may be connected to one sweep generator output or any appropriate combination thereof. Finally, while we have described our circuit in terms of three sweep generators for encoding a pulse, it is obvious that only one sweep generator may be used or alternatively that more than three may be used depending upon the number of individual addresses desired.

In the embodiment described above, it has been assumed that each of the outputs from the respective voltage controlled oscillators was at a different base frequency. This is necessary when the signals are used in a so-called "time-frequency" matrix as will be explained hereinafter. However, we do not intend to limit our invention to the use of address encoding in combination with the time-frequency matrix, it being our intention rather to describe a method and apparatus for communication which is useful in and of itself and also in connection with the time-frequency matrix coding of the type heretofore known.

Figure 4A:
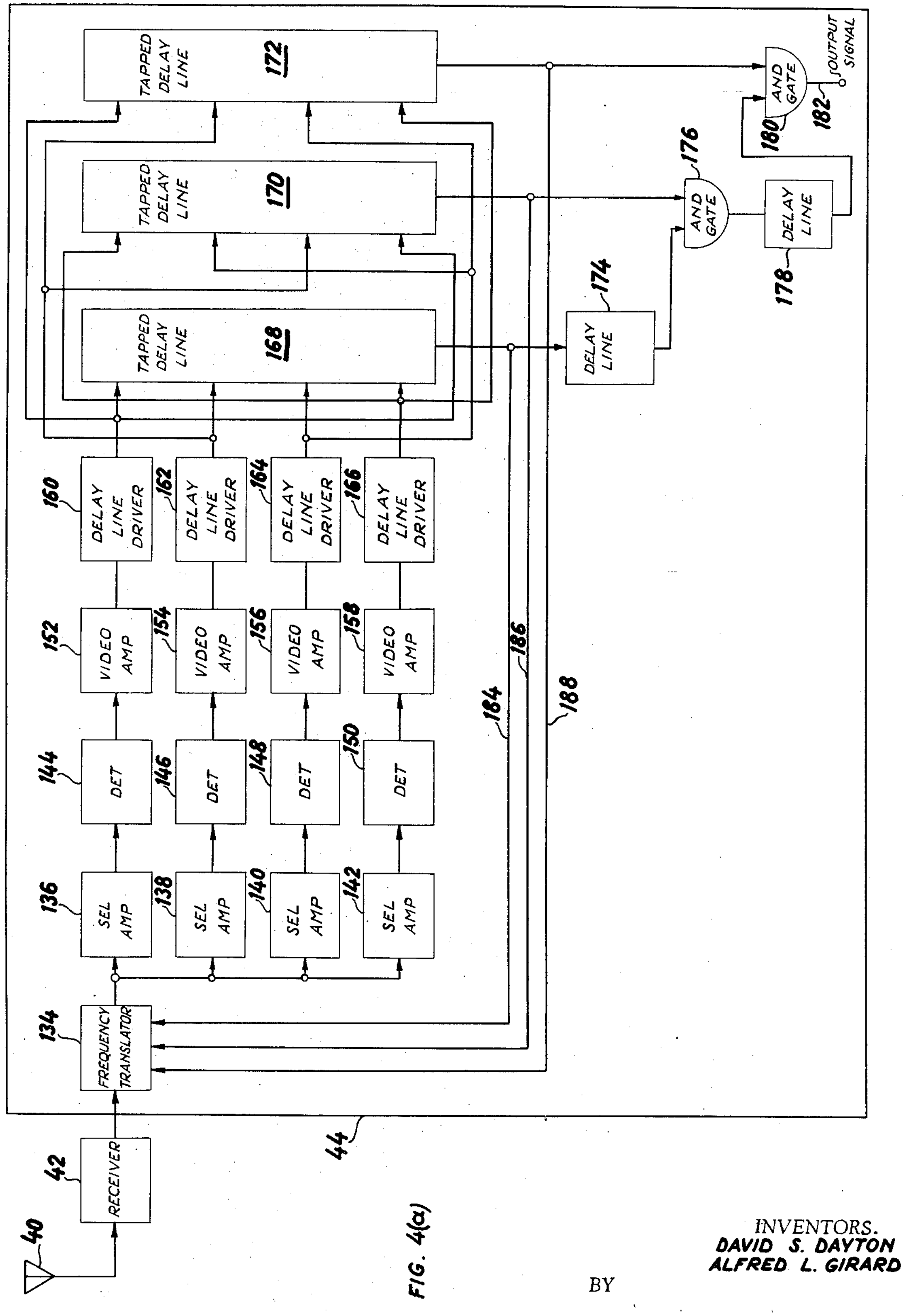
FIG. 4(*a*) is a block and line diagram of receiving apparatus useful in the practice of our invention.
Figure 4B:
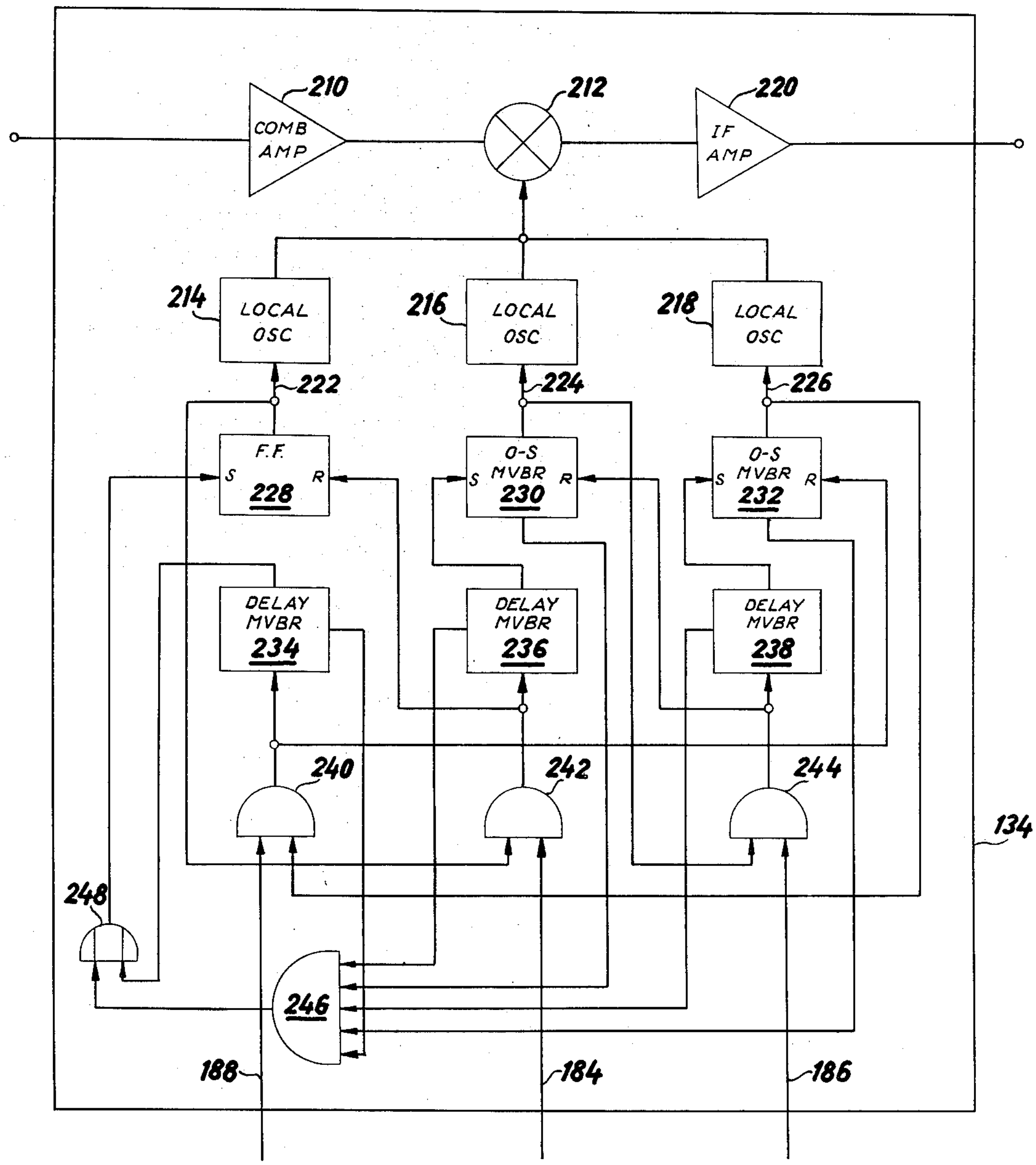

In FIG. 4(*a*) we have illustrated in greater detail one embodiment of an address decoder useful in association with the receiver of our system. The address decoder recognizes the encoded signals from the transmitter and converts them to pulse signals.

As shown, the receiver includes an antenna 40 supplying the received signal to a broad band receiver 42. The broad band receiver is of conventional and appropriate design to receive the signals and amplify them for application to the decoder. The received signals are not demodulated in the receiver but rather are supplied to the decoder as pulses of radio frequency energy having the same frequency difference, and pulse spacing as they had when they were transmitted from the transmitter.

A frequency translator, 134 is also provided which translates the signals received from the receiver to an appropriate frequency for further processing by the remaining circuitry as will be hereinafter explained. The output signal from the frequency translator 134 is supplied to a bank of four narrow band amplifiers 136, 138, 140 and 142. These narrow band amplifiers pass only that portion of the received pulse whose frequency lies within the amplifier bandwidth. Thus the output of the amplifier, for a linearly frequency-modulated input signal will be a pulse of short duration at the pass-band frequency. The output signals from the amplifiers are supplied to a bank of detectors, one for each amplifier, identified as 144, 146, 148 and 150 respectively. The detectors detect the amplitude envelope of the pulses passed by the selected amplifiers and supply these pulses to video amplifiers, one of which is provided in each channel, the video amplifiers being identified as 152, 154, 156 and 158 respectively. The amplified pulse from each of the four video amplifiers in turn is supplied to a delay line driver amplifier 160, 162, 164 and 166 and the pulses from these four amplifiers are supplied to appropriate taps on each of three tapped delay lines 168, 170 and 172. Each of the delay lines will, for one and only one spacing of individual pulses applied to the various taps provide an output pulse which is the sum of the individual pulses applied to the taps. Stated differently the taps are arranged along the delay line such that for one and only one time sequence of pulses applied to a particular set of taps, the individual pulses will travel along the delay line, reinforcing each other to provide a greatly enlarged output pulse. Thus, if a pulse sequence having a proper time spacing for the tapped delay line 168 is applied to all three delay lines 168, 170 and 172, only the delay line 168 will provide a pulse output of significant magnitude. The pulses in the sequence, when applied to the other two delay lines are of the wrong time spacing to reinforce and hence, a significantly enlarged pulse does not appear at the output.

It will also be apparent that a tapped delay line is provided in the apparatus of FIG. 4(*a*) for each of the individual frequency modulated radio frequency pulses into which the signal pulse was encoded. Thus if the encoding was into only a single r.f. pulse, only one tapped delay line of the type described would be provided.

The output of the delay line 168 is supplied to a fixed delay line 174 and the output of this delay line is in turn supplied to the "and" gate 176. The output of the second tapped delay line 170 is also supplied to the gate 176. When both the signal from tapped delay line 168, delayed by delay line 174 and the signal from delay line 170 are simultaneously present as input signals to and gate 176, the gate 176 supplies an output signal to delay line 178 which in turn supplies this signal to "and" gate 180. When an output signal from tapped delay line 172 and from delay line 178 are simultaneously present as input signals to "and " gate 180, the gate provides an output pulse which is the receiver output signal on lead 182. As explained in connection with FIG. 1, this signal may be used directly, or may be converted to analog form by a digital to analog converter if desired. It will also be observed that the output of delay line 168 is supplied via lead 184 to the frequency translator 134, as is the output signal from delay line 170 via lead 186 and the output signal from delay line 172 via lead 188. The purpose of these connections will be explained below.

In FIG. 4(*b*) we have illustrated a circuit for the frequency translator generally described above. As shown, the circuit includes a "comb" amplifier 210 having a plurality of pass-bands, separated by regions where the amplifier does not pass the input signal. Each of the "teeth" of the comb represents a pass-band having a center frequency corresponding to the base frequency of one of the incoming radio-frequency pulses into which the transmitter signal is encoded. The output signal from the comb amplifier is supplied to a mixer 212 which is also supplied by three gated local oscillators, 214, 216 and 218. The frequencies of each of the local oscillators are chosen so that, when mixed with one of the frequencies passed by the comb amplifier, a resulting base frequency will be generated which is the same for all three oscillators. The output signal from the mixer 212, is amplified by a conventional intermediate frequency amplifier 220 and the output signal from amplifier 220 is supplied as the input signal to the bank of selective amplifiers 136, 138, 140 and 142 as shown in FIG. 4(*a*).

The local oscillator 214 is normally oscillating while oscillators 216 and 218 are normally not oscillating. The frequency of oscillator 214 is chosen so that, when mixed with the base frequency of the first received r.f. pulse into which the transmitted digital signal was encoded, the i.f. frequency of amplifier 220 will be generated.

Each of the local oscillators is keyed by a signal applied to it via leads 222, 224 and 226 respectively. In the absence of this signal the oscillator will not oscillate. The keying signal for local oscillator 214 is supplied from a flip-flop circuit 228 of conventional design. The keying signals for local oscillators 216 and 218 are supplied from one-shot multivibrators 230 and 232 respectively.

In order for the local oscillators to be keyed in the proper sequence, if the pulse train for which the receiver is designed appears, we also provide logical circuitry for keying the flip-flop 228 and the one shot multivibrators 230 and 232 at the proper times in the sequence. This circuitry includes three delay multivibrators, 234, 236 and 238. These are conventional one-shot multivibrators which delay an input pulse by the amount of the multivibrator periods. "And" gates 240, 242 and 244 are associated with each of the delay multivibrators. Additionally the output signal from an "and" gate 246, having five inputs is connected as one input to the "or" gate 248. The other input signal to "or" gate 248 is the delayed pulse from delay multivibrator 234, and the output signal from "or" gate 248 is supplied to the "set" terminal of flip-flop 228. The leads 184, 186 and 188 from the output terminals of the tapped delay lines 168, 170 and 172 are connected as shown to the "and" gates 242, 244 and 240 respectively.

The frequency translator circuit of FIG. 4(*b*) operates in the following manner. Assume that the flip-flop 228 is in the "set" state, thus supplying a keying signal to local oscillator 214. This signal is supplied to the mixer 212. If now a signal is received at the correct frequency so that when mixed with the signal from local oscillator 214 it will be passed by the intermediate frequency amplifier 220. If the received signal has the correct frequency modulation characteristic, it will cause a pulse to appear on lead 184. "And" gate 242 is open by reason of the signal from flip-flop 228 supplied thereto. Accordingly, the pulse on lead 184 is passed by "and" gate 242 and triggers delay multivibrator 236 as well as resetting flip-flop 228. After a delay corresponding to the known delay between pulses, the delay multivibrator 236 keys the one-shot multivibrator 230 which changes state. During the period it remains in its operated state, the local oscillator 216 is keyed "on." If a pulse is received during this period having the correct frequency and frequency modulation, a pulse will appear on lead 186. The pulse on lead 186 initiates a chain of events similar to that just described, resulting finally in local oscillator 218 being keyed "on" for the reception of the third pulse.

If however, no pulse appears on lead 186 during the time that local oscillator 216 is keyed "on" by multivibrator 230, then the first pulse was erroneous. Under these circumstances, the flip-flop 228 must be "-set" and local oscillator 214 keyed "on" so that the receiver will be in condition to receive the next message intended for it. This is accomplished by "and" gate 246 and "or" gate 248. "And" gate 246 has five input leads, each of which is "up" when the circuit from which the lead comes is in its non-operated state. The five leads come from the one-shot multivibrators 230 and 232 and from each of the delay multivibrators 234, 236 and 238. So long as any one of these is operated no signal will appear on the output lead from gate 246. However when all are not operated, an output signal will appear on the output lead from gate 246 and will be passed by the "or" gate 248 to the set terminal of flip-flop 228. Thus, when one shot multivibrator 230 times out with no pulse appearing on lead 186, it will revert to its inoperative state. Since all five one-shot multivibrators are now not operated, flip-flop 228 will be set to its normal condition.

As noted above, the appearance of a pulse on lead 186 when multivibrator 230 is operated triggers delay multivibrator 238 and resets one-shot multivibrator 230, even if it has not timed out. After an appropriate delay, corresponding to the delay between the second and third radio-frequency pulses into which the transmitter signal was encoded, the multivibrator 232 is keyed "on," as is local oscillator 218.

If no pulse is received during the period local oscillator 218 is turned "on," then flip-flop 228 will be set as described above. If a pulse is received and appears on lead 188, during this period, it will be passed to delay multivibrator 234 and from it, after appropriate delay to the "or" gate 248 to "set" flip-flop 228. The pulse on lead 188 also causes multivibrator 232 to be reset when it appears.

Thus, the frequency translator circuit provides an output signal which is a series of pulses of r.f. energy, all at a single frequency, and all frequency modulated provided the received pulses are of proper frequency and that they are received in proper sequence. If the pulses into which the transmitted pulse was encoded are not received in correct sequence, the circuit will automatically switch back to a condition where it will receive the first pulse of the series in the next message addressed to it.

Figure 5:
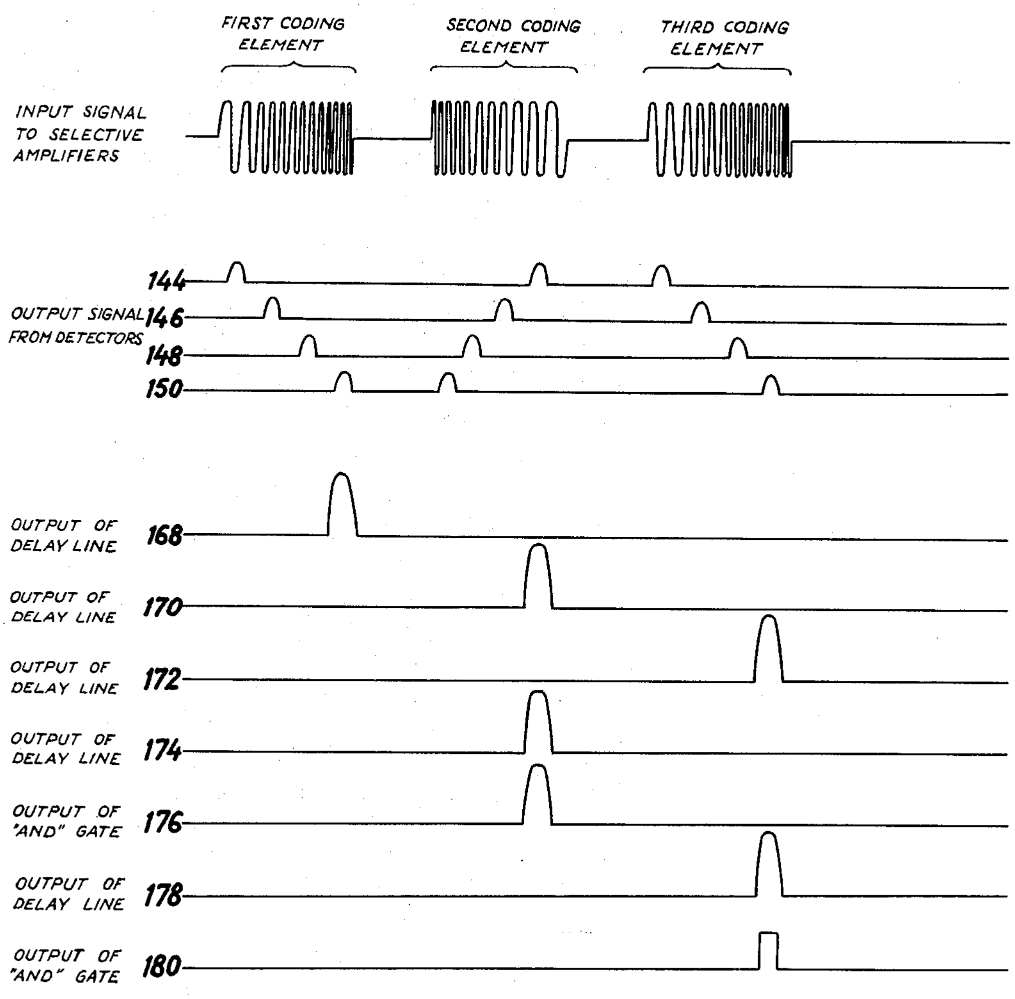
FIG. 5 is a timing diagram similar to FIG. 3 showing waveforms at various points in the circuit of FIG. 4.

FIG. 5 is a timing diagram for the address decoder shown in FIG. 4(*a*), showing the waveforms at various locations in the apparatus described. As in FIG. 3, all waveforms are shown on the same time base. The operation of the apparatus of FIG. 4(*a*) will be explained, referring both to FIGS. 4(*a*) and 5.

In describing the operation of the apparatus of FIG. 4(*a*), it will be assumed that the signal that is transmitted for reception by the receiver shown in FIG. 4(*a*) is the signal described in connection with the apparatus of FIGS. 2(*a*) and 3, i.e., that the receiver of FIG. 4(*a*) is designed to receive the signal transmitted by the address encoder described in connection with FIGS. 2(*a*) and 3.

As shown in FIG. 5, the signal received by the antenna 40 and receiver 42 and supplied to the frequency translator 134 has the form shown in the first line of the waveform diagram of FIG. 5. In the frequency translator, the received signals are translated in frequency to an appropriate base or center frequency so that portions of the received signal will pass through the selective amplifiers 136 through 142 as described above.

As previously noted, in connection with FIG. 3, the first r.f. pulse increases linearly in frequency. It is assumed that the selective amplifier 136 has a narrow pass-band centered at a lower frequency than the selective amplifier 138; selective amplifier 138 has a lower pass band than amplifier 140, and selective amplifier 142 has a pass band centered at the highest frequency of the four selective amplifiers. Accordingly, as the frequency modulated signal of the first received pulse is applied to the selective amplifiers, the selective amplifier 136 will pass a first pulse as the received frequency sweeps across its pass band. This pulse of energy is supplied to the detector 144, and the output of the detector is shown on the second line of FIG. 5. As the frequency of the received pulse continues to increase it will rise to a value where the selective amplifier 138 will pass a portion of the energy in the received signal and this will appear as a pulse at the output of detector 146 and in similar fashion pulses will appear at the output terminals of detectors 148 and 150. It will be noted that the output pulse from detector 144, associated with the selective amplifier 136 having the lowest pass band, appears first in time while the pulse from the selective amplifier 142, this amplifier having the highest frequency pass band, is the last pulse to appear when the slope of the frequency modulation characteristic is positive, i.e., when the frequency of the radio frequency pulse increases as function of time. Pulses appearing at the output of the detectors after amplification by the video amplifiers 152 through 158, are applied to all three delay lines in parallel. However, as previously explained only the delay line 168 has taps in the proper order and spacing along the delay line so that the four pulses from the detectors will be additive. In the delay lines 170 and 172 the pulses will mutually interfere and there will be no output signal from these delay lines which is substantially greater than the noise level for the pulse order and spacing shown at the left-hand side of FIG. 5. Accordingly, for the first pulse of r.f. energy, the delay line 168 provides the pulse shown on the sixth line of FIG. 5.

When the output signal from delay line 168 appears, it is applied to the delay line 174 and also appears on the lead 184. The output pulse from delay line 168 on lead 184 operates the switching arrangements in the frequency translator described above to permit the frequency translator to translate the second pulse of r.f. energy to the correct base frequency so that its frequency will be within the band pass of the selective amplifiers 136 through 142. It will be recalled that the second r.f. pulse was frequency modulated with a "-negative" slope, i.e., the frequency of the r.f. signal diminished as a function of time.

Accordingly, the first pulse to appear at any one of the detector output terminals appears at the output of the detector 150 for the second r.f. pulse. The second pulse appears at the output of detector 148 etc. as shown in FIG. 5. It will be observed that this is an inverse time sequence from that provided by the first pulse. These signals are supplied to appropriate taps on all three delay lines but because of the arrangement of the delay lines only the delay line 170 provides a significant output pulse as shown on the seventh line of the timing diagram in FIG. 5.

The output pulse from delay line 170, in addition to being supplied to "and" gate 176 is also supplied to the frequency translator 134 by lead 186 and again shifts the frequency of the frequency translator so that the third r.f. pulse of the received set will be translated in frequency by the correct amount to fall within the overall band pass of the selected amplifiers 136 through 142, all as previously described.

It will be remembered that while the slope of the third pulse into which the transmitted signal was encoded had a positive slope, as did the first pulse, the slope was steeper. Hence the output pulses will appear closer together but in the same sequence as for the first pulse. This is shown in FIG. 5. Again, the output of the video amplifier is supplied to all delay lines but only the delay line 172 has the correct incremental delays so that the individual pulses will reinforce to provide an output pulse. The output pulse from this delay line is shown on the eighth line of the waveform diagram of FIG. 5. It will also be observed that the output pulse from delay line 172 is applied to the frequency translator via lead 188 to cause it to switch the frequency to which it translates signals from the receiver 42 so that the frequency translator is in a condition to translate signals at the frequency of the first r.f. pulse should one be received thereafter.

The signal from delay line 168 is applied to the delay line 174 and is sufficiently delayed so that the output of the delay line 174 coincides in time with the output from the delay line 170. Both of these signals are supplied to the "and" gate 176 and provide the output shown on line 10 of the waveform diagram. The output of the gate 176 appearing on line 10 is further delayed by delay line 178 so that the output of delay line 178 coincides with the appearance of a pulse at the output of delay line 172. When pulses are present both at the output of the delay line 172 and at the output of the delay line 178 and are supplied to "and" gate 180. "And" gate 180 provides a pulse which indicates that a group of signals have been received whose frequencies, frequency modulation, and time spacing correspond to that for which the receiver decoder is designed. This output signal can be used as appropriate either directly or as an input to a digital to analog converter as the user may desire.

It will be apparent from the foregoing description that the address decoder of the receiver will provide an output signal, if and only if the received signal has the correct number of pulses of r.f. energy at the correct frequency and in the correct spacing and further, that the frequency modulation of the pulses is in accordance with the received encoder design.

It is apparent that only receivers provided with an appropriate decoder will receive encoded transmitted signals. By the use of our technique we have found that the probability of communication between a given transmitter and a given receiver in the presence of noise is substantially enhanced by utilizing the encoding and decoding technique described in the presence of noise particularly when it is used in conjunction with a time frequency matrix. Once the receiver is "locked on" to a first transmitter, it is very unlikely that the receiver can thereafter be "captured" by a second transmitter even though the signal from the second transmitter is much larger than signal from the first transmitter.

Our system also provides more efficient use of power limited transmitters thus increasing resistance of the communication channel to noise interference. Finally, communication systems utilizing the techniques described have substantially greater system capacity than those heretofore used, both in terms of the data rates that can be achieved and also in terms of the number of simultaneous transmissions that may be accommodated in a given bandwidth.

Figure 6:
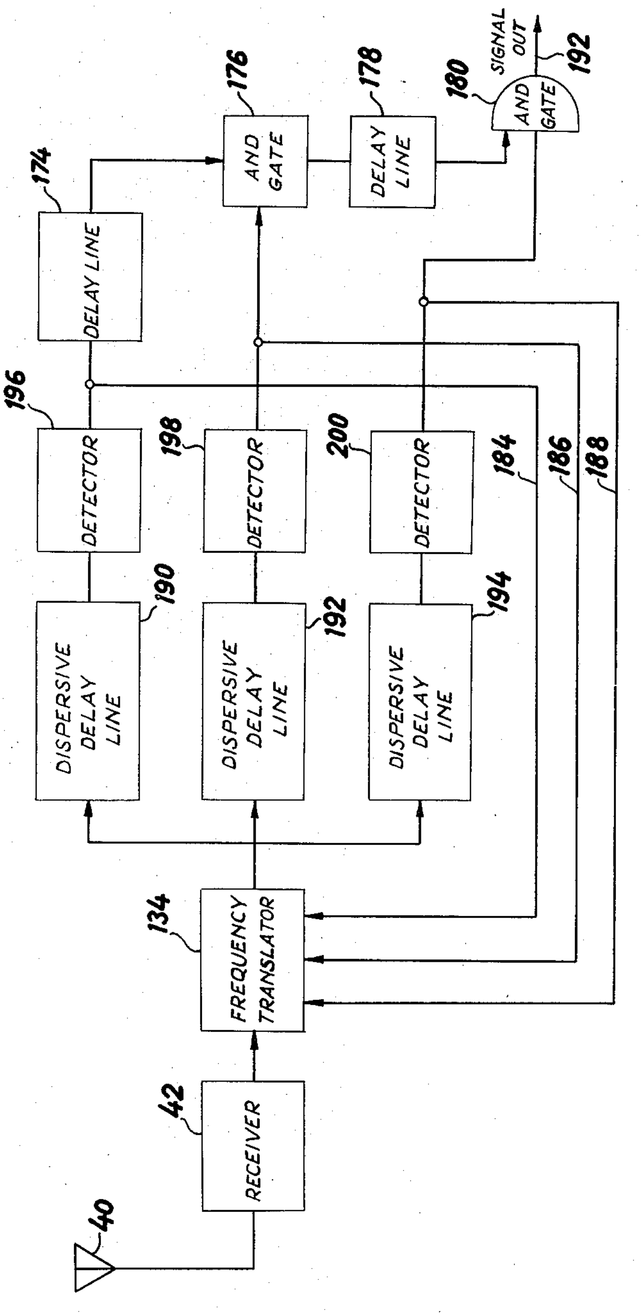
FIG. 6 is another block and line diagram illustrating another embodiment of receiving apparatus useful in the system of our invention.

FIG. 6 illustrates an alternative construction for decoding the received signal. In the construction shown in FIG. 6, the selective amplifiers, detectors, video amplifiers, delay line drivers and delay lines associated with the decoder are replaced by the dispersive delay lines 190, 192 and 194 and the detectors 196, 198 and 200. The dispersive delay lines are devices in which signals at different frequencies, when applied to the delay line, will be delayed different times. They are so designed that as a frequency modulated signal or pulse traverses the length of the delay line some of the frequency components of the signal will be delayed more than others. In the present instance, the delay line is so designed that the leading edge of the pulse is delayed sufficiently to allow the trailing edge of the pulse to "catch up" with it. Since most of the energy which was inserted into one end of the dispersive delay line over the period of the pulse comes out of the other end of the delay line substantially simultaneously, an enlarged or summed pulse is formed. The summed pulse is applied to one of the detectors 196, 198 or 200 associated with each of the delay lines and the detected pulse is then applied to a coincidence circuit such as that previously described in connection with FIG. 4.

It will also be observed that the pulses appearing at the output terminals of the detectors are supplied to the frequency translator 134 for the purpose described in connection with FIG. 4. The dispersive delay lines obviously have different characteristics and only if the frequency modulation of the pulse corresponds to the particular delay characteristics of the dispersive delay line will the energy of the pulse be "summed" to provide a significantly larger output. Thus the output of the frequency translator is supplied to all three dispersive delay lines but only one of them provides an output for each pulse of radio frequency energy supplied thereto.

Figure 7:
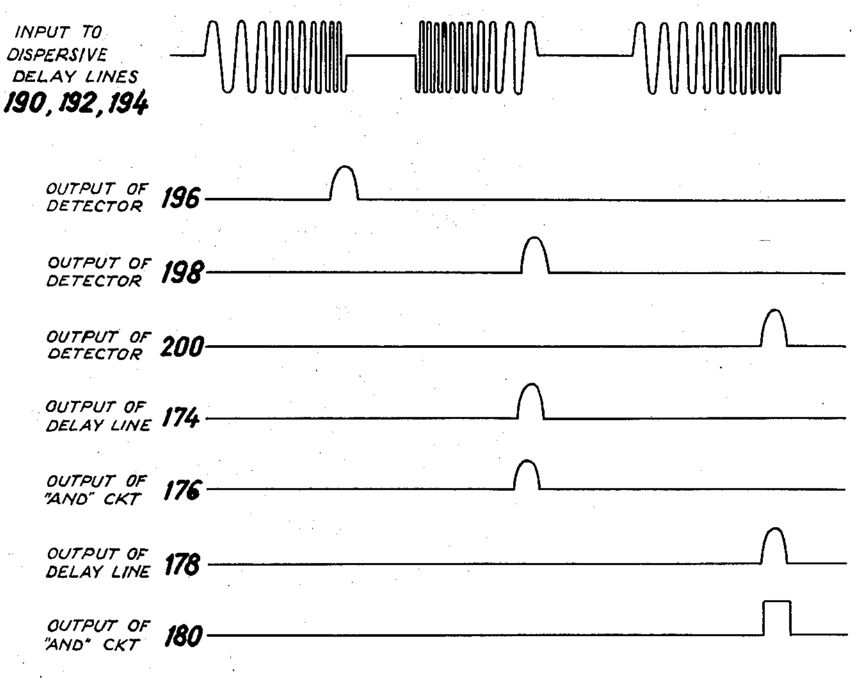
FIG. 7 is a timing diagram similar to FIGS. 3 and 5 illustrating waveforms as a function of time at various points in the circuit of FIG. 6.
Figure 8A:
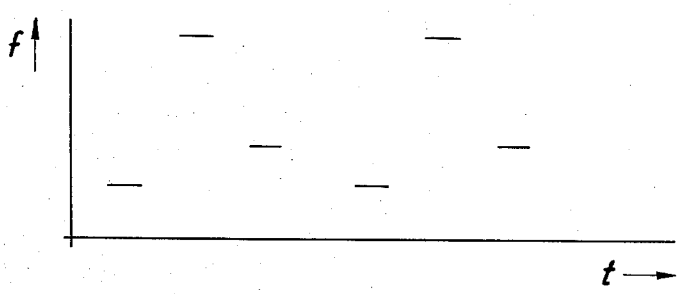
Figure 8B:
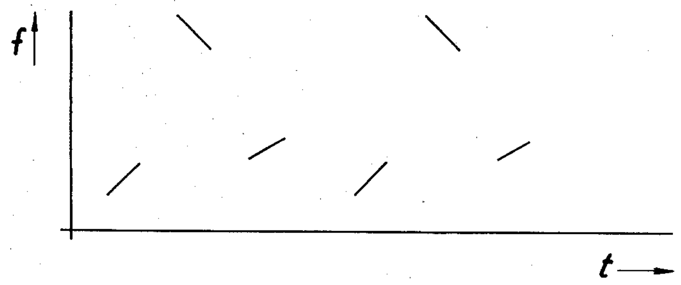
Figure 8C:
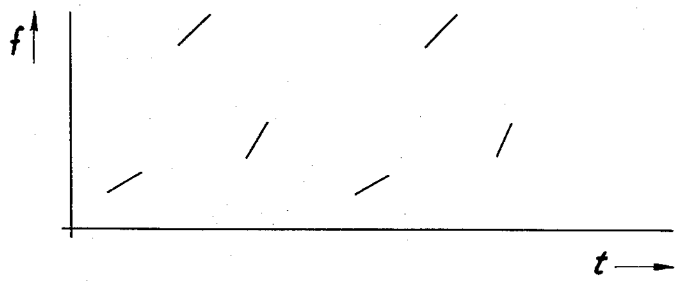
Figure 8D:
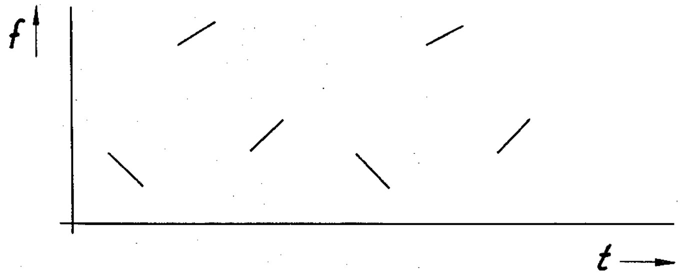

FIG. 7 is a waveform diagram showing the waveforms at various points in the circuit of FIG. 6. It is similar to FIG. 5 and the operation of the circuit is substantially identical, except that an output pulse is shown for each of the three radio frequency input pulses, the output pulse appearing at the output terminal of each of the three detectors. The remainder of the operation of the circuit and the timing diagram is substantially identical to that of FIG. 5.

As has been noted previously, while our invention has been described in connection with a system in which the individual r.f. pulses have different frequencies, it is also useful in communicating digital pulses where the frequency of each of the individual r.f. pulses is identical. Further, any number of r.f. pulses may be used to encode each pulse, including a single pulse if desired.

Further, as has been explained in connection with the illustrated circuit diagrams our invention is useful in connection with the so-called time frequency address matrix and has been so described. The manner in which the method and apparatus of our invention extends the number of addresses available in a time frequency matrix is illustrated in FIG. 8.

FIG. 8(*a*) represents a plot of frequency as a function of time for two encoded pulses of a time frequency matrix not utilizing the system of our invention. The first bit of information which is to be transmitted (using "bit" in its conventional sense meaning a binary digit) is encoded into three pulses. A first pulse is transmitted at frequency $f_1$ over a first interval. Then follows an interval during which no pulse is transmitted. The next pulse is transmitted at a frequency $f_2$ followed by an interval during which no pulse is transmitted and finally a pulse is transmitted at a frequency $f_3$ which is intermediate between $f_1$ and $f_2$. These three pulses are of constant amplitude and fixed frequency. To provide a different address using the time frequency matrix, different frequencies or different times must be selected to provide different addresses.

However, using the method of our invention, the times and frequencies may remain the same and yet be providing different combinations of rate and direction of frequency modulation, the same time-frequency address may be used for providing the addresses for different receivers. Thus, in FIG. 8(*b*) we illustrate an address in which the first pulse has a base or center frequency $f_1$ and is transmitted with a positive rate of frequency modulation; the second pulse of center frequency $f_2$ is transmitted with a negative rate of frequency modulation; the third pulse of center frequency $f_3$ is modulated in a positive direction but the rate of modulation is about twice as great as the first pulse. It will be observed that FIGS. 8(*c*) and 8(*d*) illustrate other possible addresses using the same time frequency matrix but varying the rate and direction of frequency modulation. Thus the time frequency matrix may be substantially extended to provide a number of different addresses as compared to a conventional time frequency matrix.

As so far described, each data pulse to be transmitted is coded into several separate pulses which are uniquely recognized by a receiver having corresponding coding. Another embodiment of our invention, particularly useful in the transmission of binary data, encodes each binary "1" as a single pulse of radio frequency energy whose frequency varies in a predetermined manner, as for example linearly increasing during the pulse transmission. A binary "0" is transmitted as a radio frequency pulse whose frequency modulation differs from that of the "1." For example if a linear increase in frequency during the pulse transmission is used to represent a "1," a linear decrease may be used to represent a "0." A transmitter for such a communications system is illustrated in FIGS. 9 and 10 and the receiver in FIGS. 12 and 13. FIGS. 11 and 14 are timing diagrams useful in explaining the illustrated transmitter and receiver circuits respectively.

As shown in FIG. 9, a conventional shift register 300 is loaded with binary data from a binary data source 302 over the lead 304. In the drawing the data is illustrated as being supplied to the shift register 300 in parallel but it is of course possible to supply the binary data to the shift register in serial form. The shift register 300 in response to a shift command received on lead 306, causes the data stored in it to shift to the next adjacent location which is closer to the output terminal 308. Thus, the data stored in the shift register will appear serially at the output terminal 308 in response to shift commands received on the lead 306.

The transmitter of FIG. 9 also includes a crystal oscillator 310 or other source of electrical signals of stable frequency. The output signal from the crystal oscillator 310 is provided over lead 311 to a divider network which divides the relatively high oscillator frequency down to provide repetitive timing pulses of appropriate duration and frequency for use in the transmitter as will be described. The divider circuit 310 may be of conventional design, consisting of several cascaded flip flops so that each successive stage of the divider divides the signal of the previous stage by a factor of 2. The pulse to initiate the start of the sweeping circuits to generate the desired modulation and to cause the shift register to shift the next bit of data in the shift register to the terminal 308 is provided by selecting appropriate points in the divider and gating them together to provide a pulse when desired. The pulses called the START SWEEP pulses appear on lead 313. In addition to the START SWEEP pulse, the divider circuit 312 also provides a STOP SWEEP pulse train which indicates to the sweep generating circuit that the sweep is to be terminated. This pulse train appears on lead 315. The START SWEEP pulse appearing on lead 313, as illustrated, is also supplied as a SHIFT command pulse to the shift register 300 on the lead 306.

The START SWEEP pulse train, STOP SWEEP pulse train and the DATA signal appearing at terminal 308 are supplied to the data examining circuit 314. The data examining circuit supplies as output signals an UP SWEEP command on lead 315, or a DOWN SWEEP command on lead 318 to the sweep generator 320 depending on whether the data is a binary "1" or a "0." The sweep generator 320 provides the sweep modulation that is supplied to a voltage controlled oscillator 322. The oscillator 322 is conventional and similar to the voltage controlled oscillators 108, 110 and 112 described previously except that it is not required that the oscillator 322 be keyed. Although not illustrated, the output of the voltage controlled oscillator is supplied to a radio frequency power amplifier and from it to a transmitting antenna as illustrated in FIG. 2(*a*) and as previously described. The data examining circuits 314 and the sweep generating circuit 316 are shown in greater detail in FIG. 10.

The data examining circuit includes "nand" gates 326 and 328 and a third "nand" gate 330 used as an inverter. The START SWEEP pulses appearing on lead 313 are applied to both gates 326 and 328. The signal level appearing on the output terminal 308 of the shift register 300 is applied directly to the gate 326 and, after inversion by the gate 330, as the second input to the gate 328. The output signal from gate 326 is supplied to one input terminal of a flip-flop 332, the terminal being designated "R" for reset. Similarly the output signal from gate 328 is supplied to the reset terminal of flip-flop 334. The STOP SWEEPER signal is applied to the SET command terminal of the flip-flops 332 and 334 through the inverters 336 and 338 respectively. The flip-flops are of the type which, when supplied with a "0" or negative level at the reset command terminal will cause the flip-flop to assume a state in which the reset output terminal is "0" or negative. Similarly if a "0" or a negative polarity pulse is applied to the "set" command terminal, it will cause a "0" or negative signal at the "set" output terminal and a "1" or positive level to appear at the reset output terminal.

In the data examining circuit illustrated the reset output of the flip-flops 332 and 334 are used to provide the UP SWEEP and DOWN SWEEP commands to the sweep generator. Since these outputs are negative when the flip-flop is in the reset state, inverters 340 and 342 are provided to invert their output signals for use by the sweep generator. The data examiner also provides a command to the sweep generator called a "-dump" command. As will be explained below, the actual sweep is generated by a conventional integrator circuit using an integrating capacitor as the feedback element in combination with a high gain operational amplifier. At the end of each sweep this capacitor must be discharged and for this reason a "dump" command pulse is provided. As illustrated, the output signals appearing on the output terminal of inverter 340 and 342 are further inverted by inverters 344 and 346 respectively. These two signals are supplied to "nand" gate 348 and the output signal from "nand" gate 348 is supplied as a "dump" command to the transmitter sweep generator.

The operation of the transmitter data sampler circuit will now be described. Reference to the timing diagram of FIG. 12 will be helpful in understanding the operation of the circuit.

The first waveform shown at the top of the timing diagram of FIG. 12 is a basic timing waveform shown for reference purposes. The transmitter and receiver being described operate to transmit data at a rate of 150 bits per second. Thus the period of the basic timing waveform is 6.66 milliseconds. If higher, or lower rates of transmission were desired, the frequency of the basic timing waveform would be correspondingly increased or decreased.

As described, the divider circuit 312 supplies two pulse trains. The pulses of the START SWEEP pulse train occur at the negative transitions of the basic timing waveform and are quite short. In actual practice, these pulses are of the order of 2 microseconds in length, although they are illustrated as being longer than this in FIG. 11 for the convenience of the reader. The pulses of the STOP SWEEP pulse train are considerably longer than the START SWEEP pulses, being approximately 1 millisecond in length. The STOP SWEEP pulse is initiated about 1 millisecond before each negative going transition of the basic timing waveform and terminates with the negative going transition. For purposes of explanation it is assumed that the data during the time illustrated is a "0" followed by two "1'," followed in turn by a "0" and a "1." It will be observed in FIG. 11 that a new data pulse is supplied to the data examining circuit coincidentally with each START SWEEP pulse as previously described.

In FIG. 11, the START SWEEP pulses, which are positive are supplied to each of the gates 326 and 328. If the data is positive at the same time the gate 326 will be opened and pass the start pulse, inverted to the reset terminal of flip-flop 332. However, because the inventer 330 inverts the sign of the data signal applied to gate 330, the positive START SWEEP pulse will not be passed by the gate 328 and the flip-flop 334 will remain in its set state. Conversely, if the data signal is negative, flip-flop 334 will be placed in its reset state by the START pulse and flip-flop 332 will remain in its set state. Both flip-flops are placed in the set state by the STOP SWEEP pulse about 1 millisecond before the end of the cycle of the basic timing waveform. The inverted reset output signal of the flip-flops 332 and 334 are used as respectively as an UP SWEEP and DOWN SWEEP command. As shown in FIG. 11, each "1" in the data generates an UP SWEEP pulse and each "0" a DOWN SWEEP pulse. Also, as indicated, a "dump" command pulse is generated when both the flip-flop 332 and 334 are in the set state. These signals are supplied to the transmitter sweep generator, the UP SWEEP command on lead 350, the DOWN SWEEP command on lead 352 and the "dump" command on lead 354.

The sweep generator used in the transmitter includes a conventional high gain operational amplifier 356 having a capacitor 358 connected between the output and input terminals of the amplifier 356 to provide a feedback path around it and form a conventional capacitor-type integrator. The capacitor 358 is bridged with a switch 360 so that the charge on the capacitor 358 may be "dumped" at the end of each sweep. The switch 360 is typically a field effect transistor ("FET") which is responsive to the "dump" command signal. While the switch is illustrated in FIG. 10 as being a conventional switch, it should be understood that an electronic switch is preferred and indeed is conventionally used for this purpose in capacitor type integrators.

The input signal to the sweep generator or integrator is a fixed positive or negative voltage depending upon whether an UP SWEEP or a DOWN SWEEP command is received. Two sources of voltage are provided. The source of voltage connected to the sweep sweep generator in response to an UP SWEEP command is supplied from a positive voltage source whose output terminal is indicated by "+V" connected through a resistor 362 in series with a Zener diode 364 to ground. The voltage across the Zener diode, remains substantially constant despite variations in supply voltage. The junction of the resistor 362 and diode 364 is connected through a switch 366, which is closed when a positive signal representing an UP SWEEP command is received on the lead 350. The switch 366 is preferably a field effect transistor or like device. The voltage source used to supply the integrator input voltage in response to a DOWN SWEEP command includes the resistor 368 and the Zener diode 370. It is similar to the voltage source for generating an UP SWEEP except that it is of course of inverted polarity. The voltage from the junction of resistor 368 and the diode 370 is supplied as an input to the sweep generator when a DOWN SWEEP command is received on the lead 352. The switch 372, similar to the switches 360 and 366, closes to connect the negative voltage source as an input signal when the DOWN SWEEP command is present.

The sweep output from the integrator circuit is supplied to the summing junction 374 to which a fixed voltage is also supplied when a DOWN SWEEP is required. This fixed voltage is necessary in order that the center frequency for both a "1" and a "0" will be approximately the same. If this fixed voltage were not provided, both the UP SWEEP and the DOWN SWEEP would start from the same voltage, and therefore from the same output frequency, during the UP SWEEP the frequency of the transmitter would rise above this base frequency and similarly during the DOWN SWEEP the transmitter frequency would drop below the base frequency. To provide approximately the same center frequency, a fixed voltage is added during the DOWN SWEEP so that the DOWN SWEEP starts from a voltage corresponding to the final voltage of the UP SWEEP. This fixed voltage is provided from a positive voltage source through the resistor 376 and the Zener diode 378 connected in series to ground. A potentiometer 380 is connected across the Zener diode so that an adjustable fraction of the voltage appearing across the Zener diode 380 may be supplied to the summing junction 374 through the electronic switch 382. The output voltage of the summing junction is supplied to a buffer amplifier 384 whose output signal appears on the lead 323. The sweep signal is thus supplied to the voltage controlled oscillator. The amplifier 384 is a conventional d.c. amplifier which includes a high gain operational amplifier having a resistive feedback network to provide a fixed gain, relatively high input impedance and a relatively low output impedance.

The output waveform appearing on the lead 323 is identified as the sweep generator output in FIG. 11. It will be observed that for each "1" of the data, the sweep generator provides an output which is a linear rising voltage waveform. At the time of the dump pulse, the waveform drops sharply to the reference potential and remains at the reference potential until the next sweep begins. It will also be observed that for a "0" pulse, the sweep generator provides a linearly decreasing voltage. As previously explained, the sweep having negative slope does not start from the same level as the UP SWEEP but rather starts from a level corresponding to the final voltage of the UP SWEEP by reason of the closing of switch 382 while the DOWN SWEEP is being generated, thereby supplying a fixed voltage from potentiometer 380 to the summing junction 374.

The sweep generator output signal is supplied to the voltage controlled oscillator 322 and the voltage controlled oscillator output in turn is supplied to the power amplifier and transmitted. An approximation of the final transmitted waveform, which is considerably out of scale, is shown for reference purposes as the final waveform of those shown in FIG. 11. As indicated for a "1" in the data, an UP SWEEP is generated and this causes the transmitter output to increase in frequency during the period of the sweep. For a "0" in the data the transmitter frequency decreases during the sweep period. It will be observed however, that the transmitted signal while changing in frequency is substantially constant in amplitude.

Thus, the transmitted signal is a series of radio frequency pulses which either increase or decrease in frequency depending upon whether the data to be transmitted is a "1" or a "0." Each modulated pulse corresponds to one "bit" of data and the pulses follow each other seriatim.

FIGS. 12 and 13 illustrate a receiver adapted to receive and demodulate the signals transmitted by the transmitter described and illustrated in FIGS. 9 and 10 while FIG. 14 is a waveform diagram similar to that shown in FIG. 11 to assist in understanding the receiver circuits illustrated in FIGS. 12 and 13. As shown in FIG. 12, the receiver includes an antenna 400 which supplies the signals it intercepts to a receiver 402 of conventional design for the frequency used in the communications channel. The intermediate frequency output of the receiver 402 which may, for example have a nominal value of 500 kilocycles appears on the lead 404 and is supplied as an input signal to the mixers 406 and 408. These mixers may be of conventional design; each mixer is supplied by a local oscillator such as the local oscillators 410 and 412. It will be observed that the mixer 406 and local oscillator 410 are identified as the "1 channel" and the mixer 408 and the local oscillator 412 are associated with the "0 channel." The output of each of the mixers 406 and 408 feed the dispersive delay line 414 and 416 respectively. These dispersive delay lines function in the manner heretofore described. The dispersive delay lines 414 and 416 are identical and are arranged for example to provide a short sharp output pulse when the signal supplied to them is of appropriate center frequency and has a frequency variation such that the frequency decreases as a function of time. To provide such an input signal to the dispersive delay line 416 when a "0" is received it is only necessary to translate the frequency of the IF output to the center frequency of the dispersive delay line. In a practical example of the receiver shown in FIG. 12, the IF output was nominally 500 kilocycles and the dispersive delay line provided an output pulse when the input signal decreased from 7.5 to 4.5 kilocycles over the sweep period. In the system of the invention, the IF output during the sweep period would change linearly from 501.5 kilocycles down to 498.5 kilocycles. To provide the desired output signal to the dispersive delay line, therefore the local oscillator 412 was set at 494 kilocycles. At the beginning of the sweep period the difference between 494 and 501.5 was supplied to the dispersive delay line, i.e., 7.5 kilocycles. At the end of the sweep period this difference was 498.5 − 494 or 4.5 kilocycles.

For the "1" channel where an up sweep is provided, the local oscillator 410 was set at the frequency of 506 kilocycles. Thus at the beginning of the sweep the IF output frequency was 498.5 kilocycles and the difference between 498.5 and 506 was supplied to this dispersive delay line 414, i.e., 7.5 kilocycles. As the IF frequency increased to 501.5 kilocycles the signal supplied to the dispersive delay line would diminish in frequency to 506 − 501.5 or 4.5 kilocycles per second. Thus, the signal supplied from the mixers to the dispersive delay lines 414 and 416 are such that the two delay lines may be identical. When a signal not having the proper sweep polarity is supplied to the dispersive delay lines 414 and 416, the line will merely spread the received energy out and will not provide the short sharp pulse for processing in subsequent circuits.

In FIG. 14 we have illustrated the waveforms produced by a receiver such as that illustrated in FIG. 12. The first waveform at the top of the diagram is a reference waveform similar to that used in FIG. 11. Immediately below this is shown the data supplied to the data examining circuit in the transmitter. At the receiver (ignoring transmission delays between transmitting antenna and receiver antenna) the envelope of the short sharp output pulses of radio frequency energy from the dispersive delay line for the "1 channel" are illustrated on the third line of the timing diagram and those from the "0 channel" on the fourth line. It will be observed that these occur approximately in the last quarter of the sweep. It will also be observed that the pulses occur in the one channel when data corresponding to the "1" is transmitted and in the "0 channel" when data corresponding to an "0" is transmitted.

Again referring to FIG. 12, the pulses whose envelope is illustrated in FIG. 14 are supplied to amplifier and rectifier circuits 418 and 420 respectively. In this circuit which may be identical the pulses are amplified and are full wave rectified. Both the positive and the negative rectified signals are supplied from each amplifier-rectifier circuit to the switching circuits generally indicated at 422. The reason for this will be apparent when the switching circuits are described below. The switching circuit samples the pulses in such a way that it generates an output signal if the sampling signal is not directly centered on the pulses supplied from the "1" and "0" channels. This signal is supplied to the amplifier and voltage controlled oscillator circuit 424 to adjust the frequency of the voltage controlled oscillator so that the sampling pulse is appropriately centered. The output of the voltage controlled oscillator circuit is supplied to a logic circuit generally indicated at 426 which generates the sampling pulse and supplies it via lead 428 to the switching circuits 422. The switching circuit also supplies the pulses to the data sampler 420 which resolves any ambiguity as to whether a pulse was received in the "1" or the "0" channel. The data sampler is actually a decision making circuit and it supplies a level on the lead 432 to the logic circuit 426 which in turn provides an output signal which is either a "1" or a "0" depending upon the decision of the data sampling circuit 430.

The switching circuit 422, the amplifier and voltage controlled oscillator circuit 424, the logic circuit 426 and the data sampler 430 are all illustrated in FIG. 13 in greater detail and will now be described. The circuits generally identified in FIG. 12 are enclosed in heavy dashed lines and are identified by the same reference character in FIG. 13 as in FIG. 12.

As shown, the output signal of the amplifier and rectifier 418 and the amplifier and rectifier 420 are both supplied to the switching circuit generally indicated at 422. As previously noted, the pulse of radio frequency energy which is the output of the dispersive delay line is full-wave rectified in the amplifier-rectifier circuits 418 and 420 and both the positive and negative rectified signals are supplied to the switching circuits, the polarity mark beside the lead indicating the pulse polarity appearing on it. A sampling pulse is supplied to the switching circuit 422 from the logic circuit 426. While indicated in FIG. 12 as a single line, in fact two lines are provided to supply the sampling pulse to the receiver sampling circuit and these are identified as 428*a* and 428*b* in FIG. 13. The sampling pulse is a so-called "early gate-late gate" pulse and is used to establish that the sampling pulse is centered on the received pulse. To provide this early gate-late gate sampling pulse, the voltage controlled oscillator 434 supplies an output signal of a given frequency to the logic circuit 426 and in particular supplies it to the divider circuit 436 which is similar to the divider circuit previously described in the transmitter. Various points in the divider circuit are connected to an "and" gate 438 and when signals are present at all these points a pulse is supplied to the early gate flip-flop 440. A short period after the operation of the early gate flip-flop, which operation generates the leading edge of the early gate pulse, the early gate flip-flop is reset by a reset pulse from the reset pulse gate 442 and at the same time the reset pulse is supplied to the late gate flip-flop 441 to generate the leading edge of the late gate pulse. The reset pulse which is supplied from the gate 442 occurs at the proper time by reason of the input connections to the reset pulse gate from the divider circuit. After the reset pulse has set the late gate flip-flop 441, a late gate pulse from the late gate 444 is supplied to the late gate flip-flop 441 and resets it back to its original state. Thus the early gate and the late gate immediately follow each other in time. The duration of each of them is the same and is about one half the duration of the pulse from the dispersive delay line. The signal from the early gate flip-flop is supplied on lead 428*a* to the electronic switches 446 in the "1" channel and 448 in the "0" channel. Both the switch 446 and the switch 448 are connected in series with the positive rectified input signal from the "1" and "0" channels respectively and when closed connect the positive rectified input signal to the summing terminals 450 and 452.

The switches 446 and 448 as well as the subsequent switches to be described in the switching circuit are preferably electronic switches such as field effect transistors or devices performing a similar function. These switches are normally open and operate in response to an appropriate pulse input signal to change to a closed condition for the duration of the input signal. They function as single-pole single-throw switches and are so indicated schematically in FIG. 13. The late gate signal, which immediately follows the early gate signal operates the two switches 454 and 456 in the "1" and "0" channels respectively. Both of these switches are connected in series with the negative output from the amplifier and rectifier circuits 418 and 420. Since the early gate and late gate pulses are of substantially the same length, if the transition between them occurs at the time the pulse from the amplifier and rectifier circuits is at its peak, then the energy summed at the summing point 450 and 452 will be zero since the early gate samples a positive signal and the late gate a negative signal. If however, the transition occurs prior to the time that the pulse reaches its peak, then there will be less positive energy and a greater amount of negative energy so that the junction point 450 will be negative in polarity. This will be true for either the "1" channel or the "0" channel depending upon which of the channels is supplying the pulse. The summing terminals 450 and 452 are each connected via the leads 458 and 460 respectively to the summing junction 462 in the amplifier and voltage controlled oscillator circuit 424. The output of the summing junction 462 is amplified and supplied as an error signal to the voltage controlled oscillator. If for example the transition between the early and the late gate is occurring too early, and, as explained, the net energy out of the summing junction 462 is in a negative direction, this will be applied to the voltage controlled oscillator 434 to cause it to change its frequency in such a direction that the transition between the early and late gates occurs exactly at the center frequency of the pulse output from the amplifier and rectifier circuits 418 and 420. In this way, the frequency of the voltage controlled oscillator 434 is continuously adjusted so that a clock pulse may be derived from the divider circuit 436 on the lead 462 which is in synchronism with the timing waveform at the transmitter (except for transmission delays). This clock pulse is supplied to the flip-flop 464 in the logic circuits for purposes to be hereinafter explained.

In addition to operating the switches 446, 448 and 454, 456 the early and late gates are also supplied to an OR gate 466 in the switching circuit which provides an output if either the early or the late gate is present. The output of the OR gate 466 operates a switch 468 in the "1" channel which connects the negative output of the "1" channel to the summing junction 470 in the data sampler 430. The switch 472 which is connected to the positive output of the "0" channel is also operated by the output signal from the OR gate 466. Thus, both the negative rectified output of the "1" channel and the positive output of the "0" channel are connected during the entire period of the early and late gates to the summing junction 470. The summing junction 470 is connected to the integrator formed by the operational amplifier 472 and capacitor 474 and integrated over the period of the sweep. At the end of each sweep, the divider circuit 436 which is supplied by the voltage controlled oscillator 434 operating at substantially the same frequency as the oscillator supplying the divider in the transmitter, generates a dump pulse which is supplied to the electronic switch 478 in the data sampler to dump the charge on the capacitor 474. Since opposed polarities from the "1" channel and the "0" channel are connected to the summing junction 470 the integrator in the data sampler will integrate in one direction or the other depending upon which of the two channels is supplying the largest signal. Thus if a "1" is present, the negative signal from the sampler and rectifier 418 will predominate over that from the "0" channel during the sweep period. Accordingly, the output of the summing junction 470 will be predominately negative and will be integrated over the sweep period to provide a negative output signal. The signal from the integrator in the data sampler is supplied to a very high gain amplifier 480 which does not include a feedback path around it. Thus, a very small input signal will immediately drive the amplifier 480 to saturation. The amplifier 480 is bipolar and can be driven to saturation in either the positive direction or the negative direction. Such an amplifier is sometimes termed a "sense" amplifier. The output of the sense amplifier 480 is supplied on the lead 432*a* directly to the flip-flop 464 in the logic circuit. It is also inverted by the inverter 482 and supplied on the lead 432*b* to the same flip-flop.

The flip-flop 464 is of the so-called clocked type which changes state only when a clock pulse is supplied to it and the signal on its input terminals is such as to require a change in state. Clock pulses are supplied to the flip-flop 464 at the data rate and permit it to change state at a rate corresponding to the data rate. The flip-flop 464 will change state or remain in its previous state depending upon the signal supplied to its terminals on the leads 432*a* and 432*b*. The state of the flip-flop 464 represents the output signal from the amplifier and will be either a "1" or a "0."

In FIG. 14 the output of the summing junction 470 supplied to the integrator, which is the sum of the negative signals from the "1" channel and the positive rectified signals from the "0" channel is shown on line 5. The output appearing at one terminal of the flip-flop 464 is shown on the lowest line of the timing diagram. The pulses on the next to last line of the timing diagram represent the "dump" pulses supplied from the dump pulse gate 476 to the switch 478 in the data sampler to dump the charge on the integrator following each sweep period.

Thus, dispersive delay lines are utilized to generate short sharp pulses in the receiver and these pulses are rectified and sampled by an "early gate - late gate" technique to control the frequency of an oscillator at the receiver. This oscillator in turn supplies timing signals which are synchronized to the data rate being transmitted. Additionally, by comparing the outputs of the "1" and "0" channel and using opposite rectified polarities, a decision is made in each cycle as to whether a "1" or a "0" was received and once this decision has been made, the output signal can be used to set a flip-flop to indicate whether a "1" or a "0" has been received.

Thus it will be apparent that not only is our invention useful when the pulses are encoded into a series of pulses with spaces between them but it is also useful in a communications system for communicating digital data when the data consists simply of a series of "1's" and "0's."

It will thus be seen, that we have provided a method and apparatus for the communication of information from a transmitting to a receiving station in which the information is in digital or pulse form and these pulses are encoded into at least one pulse of radio frequency energy. The pulses of radio frequency energy are modulated in frequency, preferably in a linear fashion, so that the frequency of the pulse either increases or decreases during its duration. The rate of frequency modulation may be selected as well as its direction.

We provide at the receiver a decoder and demodulator which is uniquely responsive to signals modulated or emodulated in a particular manner and the receiver provides an output signal if and only if the received signals meet the specific requirements placed on them by the decoder or demodulator. The receiver utilizes a sampling technique in one embodiment where the frequency of the received pulses is sampled and added to provide an output pulse which then conditions the decoder to receive the next pulse in the series and only if all the radio frequency pulses that are required are present does the receiver provide an output signal. In another embodiment, the receivers may use dispersive delay lines to provide output signals.

Thus we have provided an improved method and apparatus for the communication of information from one station to another, the method and apparatus depending upon translating the signal to be transmitted into a pulse of radio frequency energy, frequency modulating this pulse of energy, and providing a decoder or demodulator at the receiver to receive this energy and convert it back to a pulse signal.

It will thus be seen that the objects set forth above, among those made apparent from the preceding description, are efficiently attained and, since certain changes may be made in carrying out the method of our invention and in the apparatus set forth without departing from the scope of the invention, it is intended that all matter contained in the above description or shown in the accompanying drawings shall be interpreted as illustrative and not in a limiting sense.

Having described our invention what we claim is now and desire to secure by Letters Patent is:

1. Apparatus for communication between a transmitting location and a receiver location on a predetermined band of frequencies, comprising, in combination, 1. at said transmitter location:
   a. a source of electrical signals to be transmitted to said receiver location
   b. a modulating circuit for providing at least one fixed amplitude radio frequency signal whose frequency varies according to a predetermined continuous function, during a predetermined interval, said modulating circuit being activated by signals from said source,
   c. a power amplifier
   d. a transmitting antenna connected to said power amplifier
   e. means connecting said modulated signal to said power amplifier for amplification and transmission from said antenna; and
2. at said receiver location:
   a. a radio receiver capable of receiving transmissions from said transmitter location;
   b. a signal demodulator, said demodulator providing an output signal only in response to signals whose frequency varies according to said predetermined continuous function during said predetermined time interval
   c. means connecting said received signals to said demodulator, the output signal from said demodulator corresponding to the electrical signal activating said modulator to produce said radio frequency signal.

2. The combination defined in claim 1 in which the frequency of the radio frequency signal from said modulator varies in a substantially linear manner.

3. The combination defined in claim 1 in which said power amplifier transmits a first portion of said modulated signal during a first interval of time and a second portion during a second interval of time, the carrier frequency of said transmitted signal being different during said first and second time intervals; said receiver being capable of receiving both of said signals and said demodulator being selectively responsive to signals transmitted during said selected time intervals.

4. The combination defined in claim 1 in which said modulator provides a plurality of fixed radio frequency signals, the frequency of each varying according to individual predetermined continuous functions during a predetermined interval, and in which said demodulator includes a delay line for each fixed amplitude radio frequency signal into which said electrical signals are encoded, a coincidence circuit, means connecting the signals from said delay lines to said coincidence circuit, said coincidence circuit providing an output signal only when each of said delay lines provide an output signal in a predetermined time sequence.

5. Apparatus for selective communication of signals in pulse form between a transmitting location and a receiver location on a predetermined band of frequencies, 1. at said transmitter location:
   a. a source of electrical signals in pulse form to be transmitted to said receiver location
   b. an address encoder for providing at least one fixed amplitude radio frequency signal whose frequency varies according to a predetermined continuous function in a known manner during a predetermined interval corresponding to the interval in which one of the pulses from said source is to be transmitted, said encoder being activated to provide said signal by pulses from said source
   c. a radio transmitter for transmitting said radio frequency signals; and
2. at said receiver location:
   a. a radio receiver capable of receiving said transmitted radio-frequency signals from said transmitter
   b. an address decoder, said decoder providing an output signal only in response to signals whose frequency varies according to said predetermined continuous function during said predetermined time interval
   c. means connecting said received signal to said address decoder, the output signal from said address decoder corresponding to the pulse signal activating said address encoder to produce said fixed amplitude radio frequency signal.

6. A communication system for transmitting information in pulse form between a first and a second station comprising in combination a transmitter and an address encoder at said first station, said address encoder providing at least one fixed amplitude signal whose frequency continuously varies as a function of time in a predetermined manner to modulate said transmitter during the interval when a signal corresponding to a pulse is to be transmitted, and providing no signal to said transmitter during the interval when no pulse is to be transmitted, a receiver adapted to receive the signals transmitted by said transmitter and an address decoder at said second station, said address decoder providing an output only in response to the presence of said predetermined frequency variations in the received signal to provide a pulse output signal, and otherwise providing no pulse output signal, the presence of a pulse in said address decoder output signal thereby indicating the presence of a pulse at said transmitter and the absence of a pulse indicating the absence of a pulse at said transmitter.

7. The combination defined in claim 6 in which the continuous variation in frequency of said address encoder signal is substantially linear as a function of time.

8. The combination defined in claim 6 in which said transmitter transmits a portion of said address encoder signal during a first interval of time and another portion during a second interval of time, the transmitter carrier frequency being different during said first and second time interval; said receiver being capable of receiving both of said signals and said address decoder being selectively responsive to signals transmitted during said selected time intervals.

9. A communication system for communicating information in the form of pulses of electrical energy from a transmitting to a receiving location comprising in combination, a source of signal pulses, an address encoder, means connecting said signal pulses to said address encoder, said address encoder converting each of said signal pulses to a plurality of pulses of radio frequency energy, each of said radio frequency pulses being frequency modulated according to a predetermined continuous function, means for amplifying and transmitting said radio frequency pulses, a receiver at said receiver location adapted to receive the signals from said transmitter, an address decoder, means connecting said receiver signals to said address decoder, said address decoder being selectively responsive to the number, spacing, frequency and predetermined frequency modulation of said received radio frequency pulses to produce an output pulse corresponding to the signal pulse supplied to said address encoder.

10. The combination defined in claim 9 in which said address decoder includes a frequency translator, a plurality of narrow band filters supplied by said frequency translator, a tapped delay line for each of the radio frequency pulses into which pulses from said source are encoded at said transmitted location, means for detecting the output signals from each of said filters, and means connecting the output signal from said detectors to said delay lines, a logical coincidence circuit, and means connecting the output signals from said tapped delay lines to said coincidence circuit, said coincidence circuit providing an output signal only when each of said tapped delay lines provides an output signal in a predetermined time sequence.

11. The combination defined in claim 9 in which said address decoder includes a frequency translator, a plurality of dispersive delay lines supplied by said frequency translator, one of said delay lines being provided for each of the radio frequency pulses into which pulses from said source are encoded at said transmitter location, a logical coincidence circuit, means including detecting means for connecting the output signals from said dispersive delay lines to the logical coincidence circuit, said coincidence circuit providing an output signal only when each of said dispersive delay lines provide an output signal in a predetermined time sequence.

12. Apparatus for selective communication between a transmitting location and a receiver location through a transmitting medium on a predetermined band of frequencies, comprising, in combination, 1. at said transmitter location:
   a. a source of electrical signals in binary form to be transmitted to said receiver location
   b. a modulator for providing, in response to a signal corresponding to a binary zero a fixed amplitude radio frequency pulse whose frequency varies according to a first predetermined continuous function over at least a portion of said pulse, and for providing in response to a signal corresponding to a binary one, a fixed amplitude radio frequency pulse whose frequency varies according to a second predetermined continuous function over at least a portion of said pulse
   c. a power amplifier
   d. radio frequency coupling means for coupling radio frequency signals to the transmitting medium connected to said power amplifier
   e. means connecting said modulated signal to said power amplifier for amplification and transmission from said radio frequency coupling means; and
2. at said receiver location:
   a. radio receiver capable of receiving transmissions from said transmitter location;
   b. a demodulator, selectively responsive to pulses whose frequency varies according to either of said predetermined continuous functions, said demodulator responding to a pulse whose frequency varies according to said first predetermined continuous function by generating an output corresponding to a binary zero and to a pulse whose frequency varies according to said second predetermined continuous function by generating an output corresponding to a binary one
   c. means connecting said received signals to said demodulator, the output signal from said demodulator corresponding to the electrical signal received by said modulator to produce said transmitted radio frequency signal.

13. The combination defined in claim 12 in which said demodulator includes frequency translating means, a pair of dispersive delay lines supplied with electrical signals from said frequency translating means one of said delay lines being responsive to pulses corresponding to zeros in the transmitted data and a second of said delay lines being responsive to pulses corresponding to ones in the transmitted data and a decision making circuit responsive to signals from said delay lines to determine whether a one or a zero is received in a given predetermined period.

14. The combination defined in claim 13 which includes a controllable oscillator located at said receiver, means responsive to the signal from said oscillator for generating timing pulses for use in said receiver, said timing pulses including a sampling pulse for sampling the signals from said delay lines, means supplying the average value of said sampled received pulses from said delay lines as a signal to control said oscillator frequency, thereby synchronizing the timing of said receiver and transmitter.

* * * * *